United States Patent
Suzuki et al.

(10) Patent No.: US 11,812,109 B2
(45) Date of Patent: *Nov. 7, 2023

(54) PORTABLE TERMINAL DEVICE, TELEVISION RECEIVER, AND INCOMING CALL NOTIFICATION METHOD

(71) Applicant: MAXELL, LTD., Kyoto (JP)

(72) Inventors: Motoyuki Suzuki, Oyamazaki (JP); Hiroshi Shimizu, Oyamazaki (JP); Yasunobu Hashimoto, Oyamazaki (JP); Kazuhiko Yoshizawa, Oyamazaki (JP); Mitsunobu Watanabe, Oyamazaki (JP); Tomonori Nomura, Oyamazaki (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,543

(22) Filed: Apr. 15, 2022

(65) Prior Publication Data
US 2022/0239984 A1    Jul. 28, 2022

Related U.S. Application Data

(63) Continuation of application No. 16/335,486, filed as application No. PCT/JP2016/077930 on Sep. 23, 2016, now Pat. No. 11,310,561.

(51) Int. Cl.
*H04N 21/478*    (2011.01)
*H04M 1/00*    (2006.01)
(Continued)

(52) U.S. Cl.
CPC ......... *H04N 21/478* (2013.01); *G06F 1/1694* (2013.01); *H04M 1/00* (2013.01);
(Continued)

(58) Field of Classification Search
None
See application file for complete search history.

(56) References Cited

U.S. PATENT DOCUMENTS

| | | |
|---|---|---|
| 2003/0162560 A1 | 8/2003 | Kaneko |
| 2010/0074138 A1 | 3/2010 | Hara et al. |

(Continued)

FOREIGN PATENT DOCUMENTS

| | | |
|---|---|---|
| JP | 2003-258944 A | 9/2003 |
| JP | 2009-088960 A | 4/2009 |

(Continued)

OTHER PUBLICATIONS

U.S. PTO Notice of Allowance issued in related parent U.S. Appl. No. 16/335,486, dated Dec. 13, 2021.

(Continued)

*Primary Examiner* — James R Marandi
(74) *Attorney, Agent, or Firm* — McDermott Will & Emery LLP

(57) ABSTRACT

There is provided a portable terminal device 2 that notifies a television receiver 1 of a received phone call or mail. The portable terminal device 2 includes a communication unit 210 that receives a phone call or mail and communicates with the television receiver, a notification execution unit 203c that performs control in a case where information of the phone call or the mail received by the communication unit is notified to the television receiver, and a posture detection execution unit 203e that detects a posture of the portable terminal device. In a case where the communication unit receives a phone call or mail, the notification execution unit changes content of the information of the received phone call or mail according to a detection result of the posture detection execution unit and notifies the television receiver of the changed content.

13 Claims, 18 Drawing Sheets

(51) Int. Cl.
  *H04M 19/04* (2006.01)
  *H04N 21/41* (2011.01)
  *H04M 1/72412* (2021.01)
  *G06F 1/16* (2006.01)
  *H04M 1/02* (2006.01)
  *H04M 7/00* (2006.01)
  *H04N 21/4223* (2011.01)

(52) U.S. Cl.
  CPC ..... *H04M 1/0264* (2013.01); *H04M 1/72412* (2021.01); *H04M 7/0027* (2013.01); *H04M 7/0033* (2013.01); *H04M 19/04* (2013.01); *H04N 21/41265* (2020.08); *H04N 21/4223* (2013.01)

(56) References Cited

U.S. PATENT DOCUMENTS

| | | |
|---|---|---|
| 2012/0242474 A1 | 9/2012 | Oh |
| 2013/0165096 A1 | 6/2013 | You |
| 2014/0267542 A1 | 9/2014 | Nakamura |
| 2014/0373102 A1 | 12/2014 | Fujimoto |
| 2015/0370323 A1 | 12/2015 | Cieplinski |
| 2016/0035311 A1 | 2/2016 | Ryo |
| 2017/0064064 A1 | 3/2017 | Kimura |
| 2017/0074138 A1 | 3/2017 | Srinivasan et al. |
| 2017/0214952 A1 | 7/2017 | Karanth |
| 2018/0248991 A1 | 8/2018 | Ryu |

FOREIGN PATENT DOCUMENTS

| | | |
|---|---|---|
| JP | 2009-164780 A | 7/2009 |
| JP | 2012-142664 A | 7/2012 |
| JP | 2013-110472 A | 6/2013 |
| JP | 2013-145947 A | 7/2013 |
| JP | 2015-159507 A | 9/2015 |
| JP | 2015-195433 A | 11/2015 |
| JP | 2016-042744 A | 3/2016 |

OTHER PUBLICATIONS

U.S. PTO Non-Final Office Action issued in related parent U.S. Appl. No. 16/335,486, dated May 13, 2021.
U.S. PTO Final Office issued in related parent U.S. Appl. No. 16/335,486, dated Oct. 29, 2020.
U.S. PTO Non-Final Office issued in related parent U.S. Appl. No. 16/335,486, dated Jan. 16, 2020.
Parent U.S. Appl. No. 16/335,486, filed Mar. 21, 2019.
Japanese Notice of Reasons for Refusal issued in corresponding Japanese Patent Application No. 2018-540548, dated Jun. 9, 2020, with English translation.
International Search Report issued in International Application PCT/JP2016/077930, dated Dec. 13, 2016 (with English translation).

FIG. 7
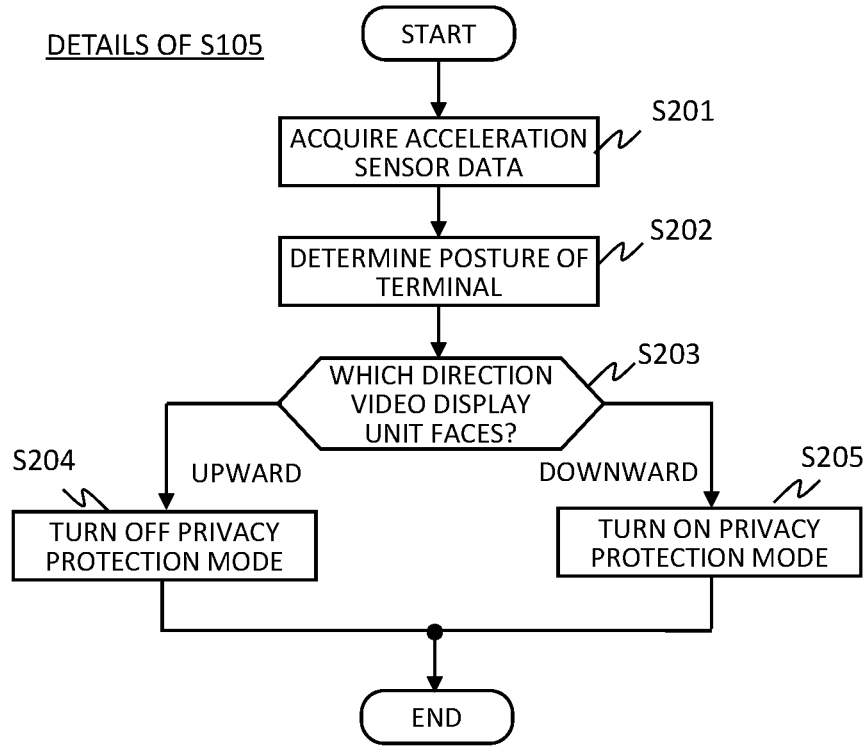
FIG. 8
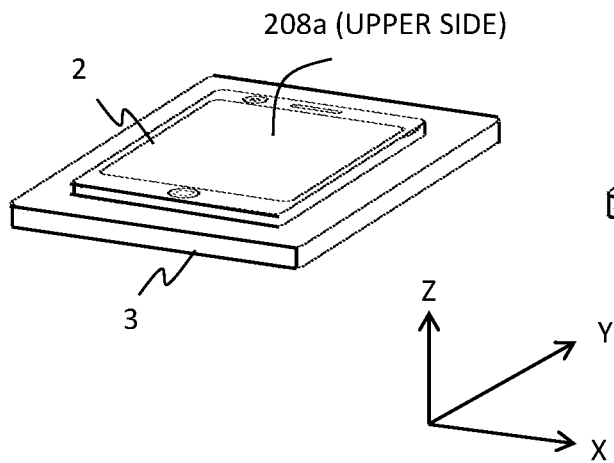
(a) PROTECTION MODE = OFF
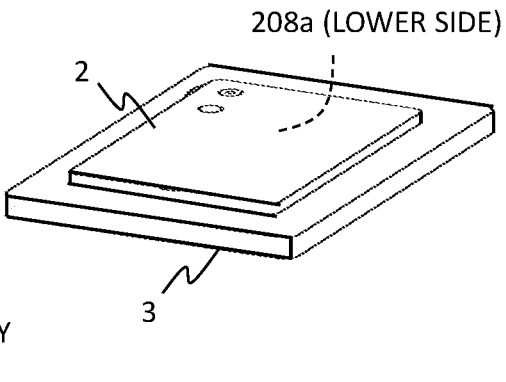
(b) PROTECTION MODE = ON

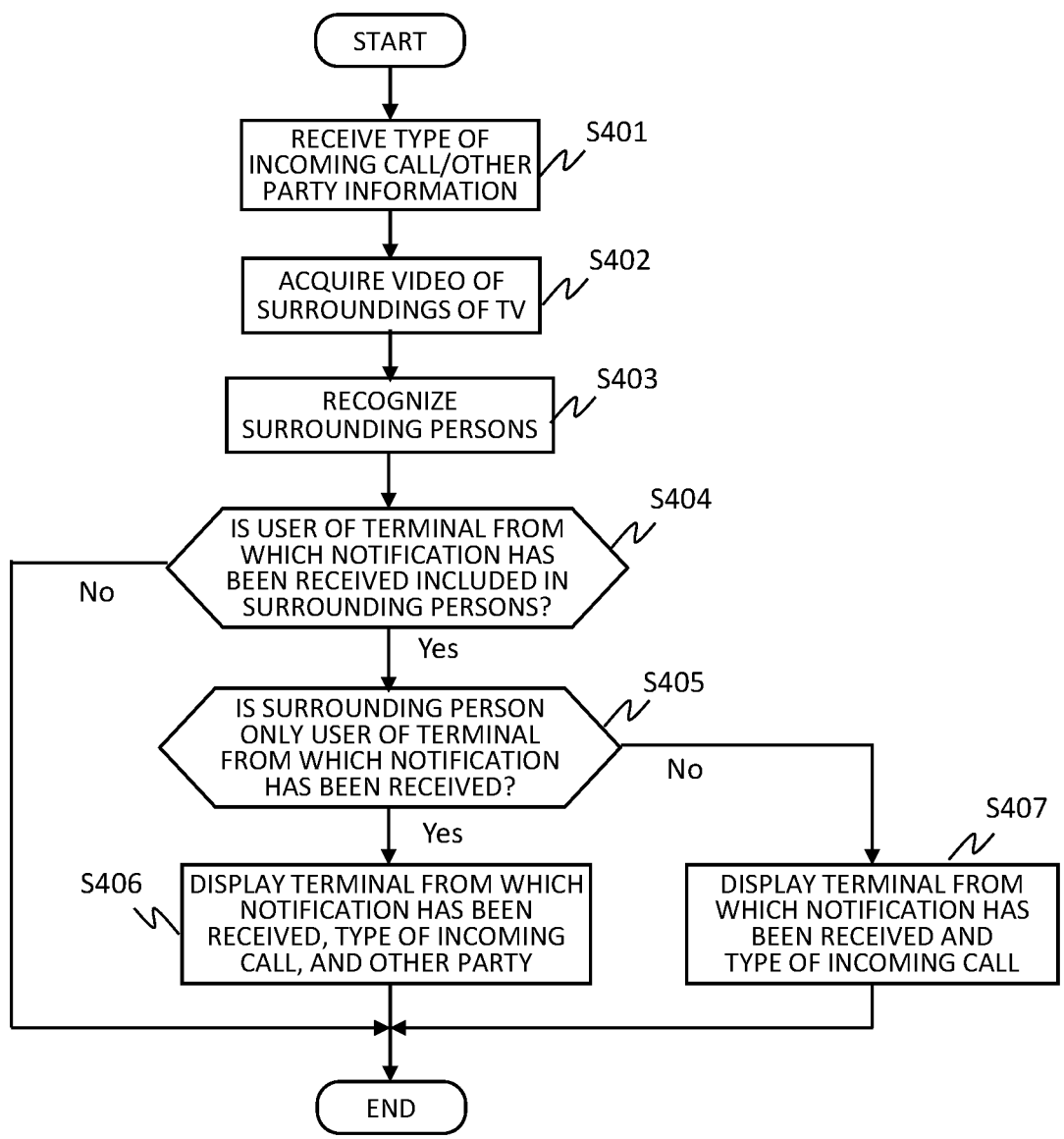

MAIL DISPLAY

VOICE CALL

VIDEO CALL

PORTABLE TERMINAL DEVICE, TELEVISION RECEIVER, AND INCOMING CALL NOTIFICATION METHOD

CROSS REFERENCE

This application is a Continuation of U.S. patent application Ser. No. 16/335,486, filed on Mar. 21, 2019, which is a U.S. National Phase under 35 U.S.C. § 371 of International Application No. PCT/JP2016/077930, filed on Sep. 23, 2016 the entire content of which is hereby incorporated by reference.

TECHNICAL FIELD

The present invention relates to a portable terminal device, a television receiver, and an incoming call notification method.

BACKGROUND ART

A technique has been proposed which, in a case where a portable terminal device, such as a mobile phone device, receives a phone call or mail, displays information indicating that the phone call has been received on a television receiver.

For example, Patent Document 1 discloses the following configuration: "in a case where a fixed phone or a portable phone receives a phone call, phone number information including at least a calling phone number, which is the other party of the phone that has received the phone call, is acquired from the fixed phone or the portable phone that has received the phone call through a communication interface unit; notification information for notifying that a phone call including at least the calling telephone number included in the phone number information is edited into a display format which can be displayed on a television screen of a television receiver and is transmitted as incoming call notification information to the television set through a host interface unit; and the incoming call notification information is displayed on the television screen".

In addition, Patent Document 2 discloses the following configuration: a portable terminal device that is being charged includes "a transmitting/receiving means that is connected to at least a mobile telephone network so as to communicate with the mobile telephone network, a secondary battery charging means, a detection means for detecting a charging state, an information display means, and a local communication means for communicating with an external local communication device; in a case where the portable terminal device is connected to the local communication device so as to communicate with the local communication device at the time of the charging of a secondary battery, the portable terminal device notifies the user of a received phone call through the transmitting/receiving means, the content of the received phone call, and the charging state of the secondary battery; and in a case where there is an instruction not to display information on the display means, the display of the received phone call on the display means is not performed".

CITATION LIST

Patent Document

Patent Document 1: JP 2012-142664 A
Patent Document 2: JP 2013-145947 A

SUMMARY OF THE INVENTION

Problems to be Solved by the Invention

A portable terminal device, such as a mobile phone device, is connected to an adapter (charging device) for charging a battery in a wired manner or wirelessly and is charged. Since the adapter for charging is connected to a receptacle and is then used, the portable terminal device is also placed close to the receptacle and is separated from the user's hands for a charging period. Charging takes several tens of minutes. In a case where the user watches the television during that time, the user may not hear the phone ringing even if a phone call or mail is received from another person.

In a case where a plurality of persons, such as family or friends, watch the television receiver simultaneously and the information of the portable terminal device which has received a phone call and the information of a caller who is the other party of the portable terminal device are displayed on the screen as in Patent Document 1, there is a problem that the privacy of the user of the portable terminal device which has received the call is not protected.

Further, in Patent Document 2, the phone call received by the portable terminal device, the content of the received phone call, and the charging state of the secondary battery are transmitted to the external communication device. The content of the received phone call can be prevented from being displayed on the display means of the portable terminal device, but is displayed on the external communication device. Here, in a case where the external communication device is a television receiver, there is a problem that the privacy of the user is not protected.

In view of the above-mentioned problems, an object of the invention is provide a portable terminal device, a television receiver, and an incoming call notification method that protect the privacy of a user in a case where information of a phone call received by the portable terminal device is notified to the television receiver and is then displayed.

Solutions to Problems

A technique disclosed in the claims is used as a means for solving the problems. For example, there is provided a portable terminal device that notifies a television receiver of a received phone call or mail. The portable terminal device includes: a communication unit that receives a phone call or mail and communicates with the television receiver; a notification execution unit that performs control in a case where information of the phone call or the mail received by the communication unit is notified to the television receiver; and a posture detection execution unit that detects a posture of the portable terminal device. In a case where the communication unit receives a phone call or mail, the notification execution unit changes content of the information of the received phone call or mail according to a detection result of the posture detection execution unit and notifies the television receiver of the changed content.

Effects of the Invention

According to the invention, it is possible to protect the privacy of a user of the portable terminal device in a case where information of a phone call received by the portable terminal device is notified to the television receiver and is then displayed.

BRIEF DESCRIPTION OF THE DRAWINGS

FIG. 7 is a flowchart illustrating the details of a privacy protection mode check process (S105) in FIG. 5.

FIG. 8 is a diagram illustrating an example of a relationship between the posture of the portable terminal device 2 and a privacy protection mode.

FIG. 14 is a flowchart illustrating an example of a notification operation of the television receiver 1.

MODE FOR CARRYING OUT THE INVENTION

Hereinafter, examples of embodiments of the invention will be described with reference to the drawings.

Embodiment 1

Figure 1:
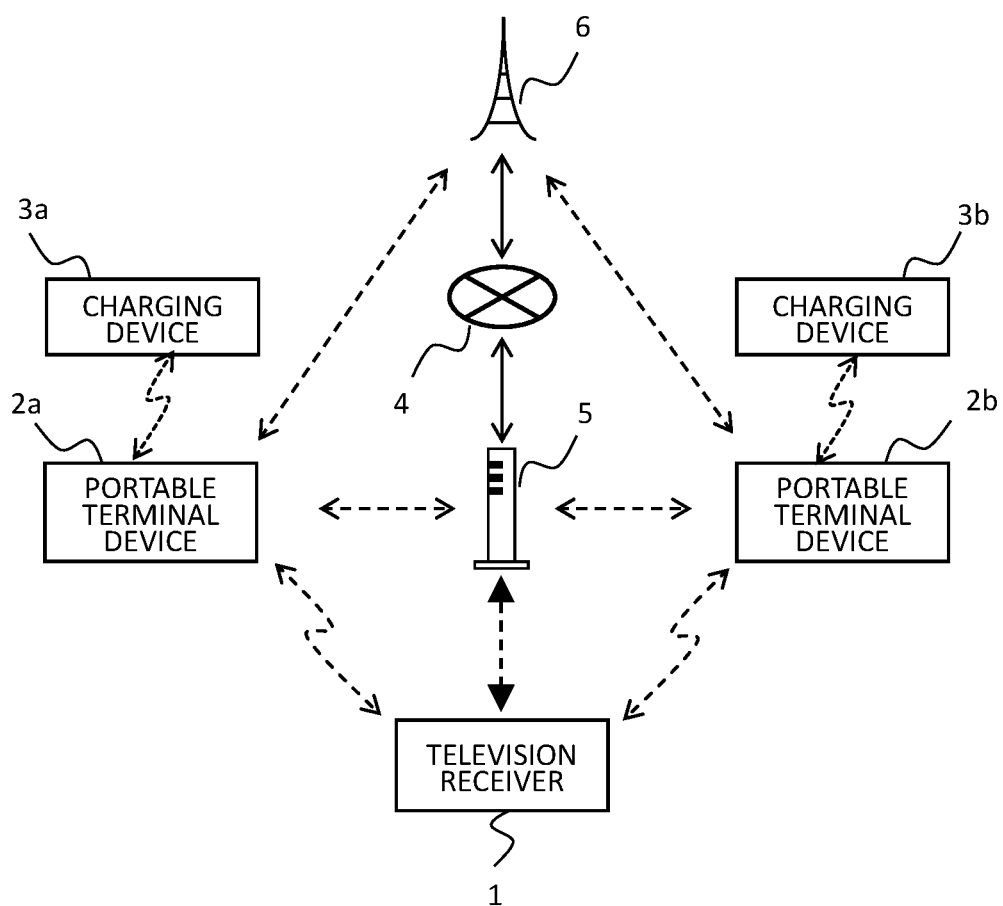
FIG. 1 is a diagram illustrating an example of the configuration of an incoming call notification system including a television receiver and a portable terminal device (Embodiment 1).

FIG. 1 is a diagram illustrating an example of the configuration of an incoming call notification system including a television receiver and a portable terminal device. The incoming call notification system includes a television receiver 1, two portable terminal devices 2a and 2b, two charging devices 3a and 3b, a wide-area public network 4, such as the Internet, a router 5, and a base station 6 of a mobile telephone network. The system notifies the cooperating television receiver 1 of the information of a phone call or mail received by the portable terminal devices 2a and 2b such that the information is displayed on the television receiver 1. In addition, the number of portable terminal devices 2 is not limited thereto and any number of portable terminal devices 2 may be provided.

Figure 2A:
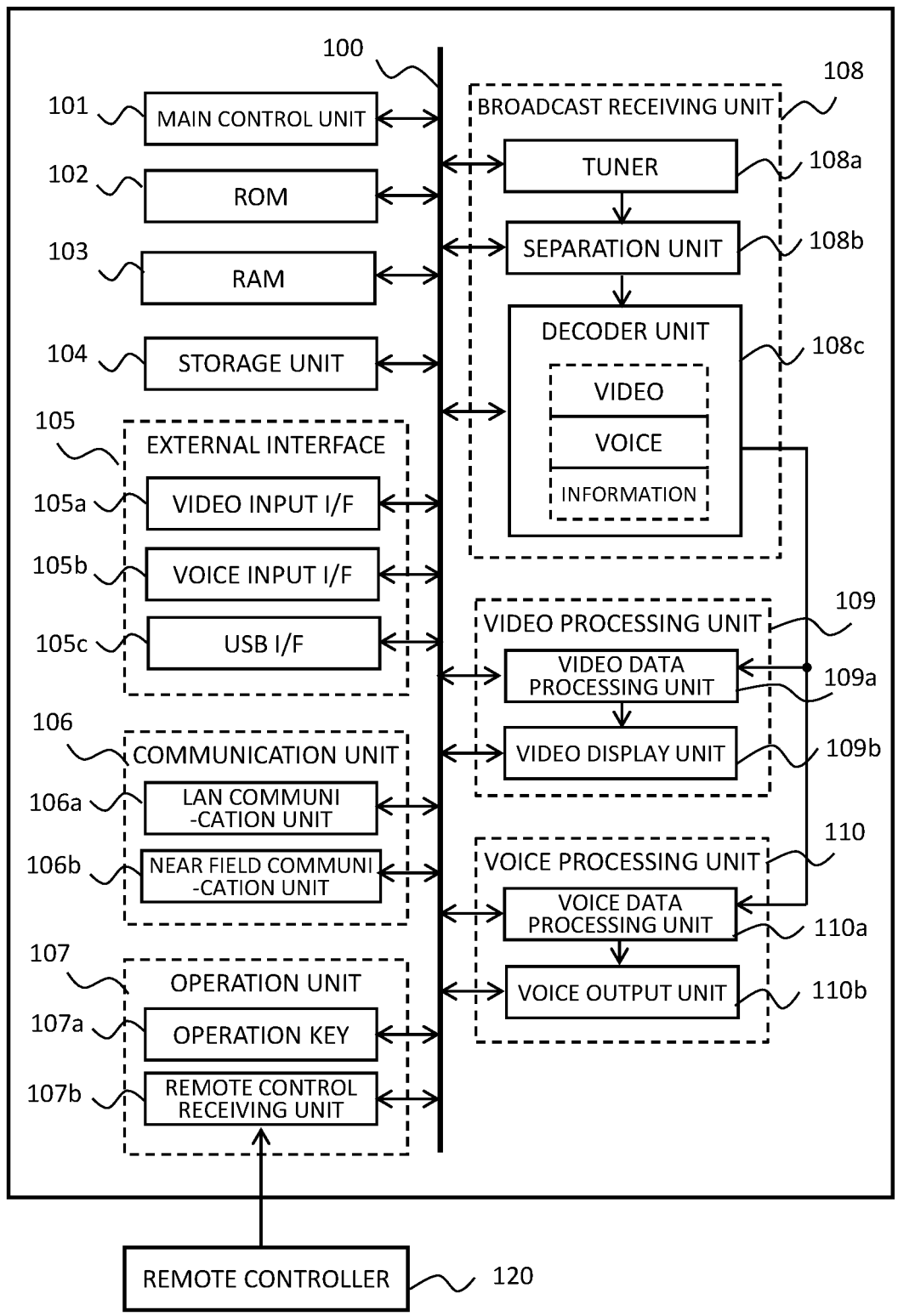
FIG. 2A is a block diagram illustrating an example of the configuration of a television receiver 1.

FIG. 2A is a block diagram illustrating an example of the configuration of the television receiver 1. The television receiver 1 includes a system bus 100, a main control unit 101, a read only memory (ROM) 102, a random access memory (RAM) 103, a storage unit 104, an external interface 105, a communication unit 106, an operation unit 107, a broadcast receiving unit 108, a video processing unit 109, and a voice processing unit 110. The television receiver 1 may be, for example, a recording/reproduction device having a function of recording and reproducing a broadcast program or a cable television set-top box.

The system bus 100 is a data communication path for transmitting and receiving data between the main control unit 101 and each unit of the television receiver 1. The main control unit 101 is a microprocessor unit that controls the overall operation of the television receiver 1 according to a predetermined program.

The ROM 102 is a memory that stores a basic operation program, such as an operating system, and other application programs and is, for example, a rewritable ROM, such as an electrically erasable programmable ROM (EEPROM) or a flash ROM. It is assumed that the program stored in the ROM 102 is updated to increase the version of the basic operation program or other application programs or to extend the functions of the programs.

The RAM 103 functions as a work area in a case where the basic operation program or other application programs are executed. The ROM 102 and the RAM 103 may be integrated with the main control unit 101. In addition, the ROM 102 may not be independently configured as illustrated in FIG. 2A and a partial storage area of the storage unit 104 may be used as the ROM 102. Further, it is assumed that the RAM 103 has a temporary storage area which temporarily stores data if necessary in a case where the basic operation program or various application programs are executed.

The storage unit 104 stores information or data such as each operation setting value of the television receiver 1. In addition, it is assumed that the television receiver 1 can download a new application program from an application server (not illustrated) through the Internet 4 and the router 5 to extend the functions. At that time, the downloaded new application program is stored in the storage unit 104. The main control unit 101 expands the new application program stored in the storage unit 104 in the RAM 103 and executes the expanded new application program. In this way, the television receiver 1 can implement various new functions.

All or some of the functions of the ROM 102 may be replaced by a partial area of the storage unit 104. In addition, the storage unit 104 needs to hold the stored information even in a state in which no power is supplied to the television receiver 1. Therefore, a device, such as a flash ROM, a solid state drive (SSD), or a hard disk drive (HDD), is used.

The external interface 105 is an interface group for extending the functions of the television receiver 1 and includes a video input interface 105a, a voice input interface 105b, and a universal serial bus (USB) interface 105c in this embodiment. The video input interface 105a and the voice input interface 105b input a video signal and a voice signal from an external video/voice output device. The USB interface 105c connects a USB device, such as a keyboard, or a memory card. For example, in a case where the television receiver 1 records a digital broadcast program on an external HDD device, the HDD device may be connected to the USB interface 105c. In addition, the video input interface 105a and the voice input interface 105b may be configured to input a video and voice at the same time using High-Definition Multimedia Interface (HDMI (registered trademark)).

The communication unit 106 is connected to the router 5 by a wired LAN or a wireless LAN and includes a LAN communication unit 106a that transmits and receives information to and from the external network 4, such as the Internet, and a near field communication unit 106b that transmits and receives information using near field communication, such as Bluetooth (registered trademark). In this embodiment, the communication unit 106 communicates with the external portable terminal device 2 (2a and 2b) through the near field communication unit 106b.

The operation unit 107 is an instruction input unit that inputs an operation instruction to the television receiver 1 and includes an operation key 107a in which button switches are arranged and a remote controller receiving unit 107b that receives an infrared signal from the remote controller 120. In addition, for example, a keyboard connected to the USB interface 105c is used to operate the television receiver 1. Further, for example, a portable terminal device or other PCs connected through the communication unit 106 may be used to operate the television receiver 1.

The broadcast receiving unit 108 includes a tuner 108a, a separation unit 108b, and a decoder unit 108c. The tuner 108a extracts a signal of a channel selected by the user from broadcast waves received by an antenna (not illustrated) and demodulates a transport stream (TS) signal. The separation unit 108b separates the TS signal into packetized video data, voice data, and accompanying information data. The decoder unit 108c decodes the video data, the voice data, and the accompanying information data output from the separation unit 108b. The video signal is output to the video processing unit 109 and the voice signal is output to the voice processing unit 110. Service information (SI) including program information, such as the name, genre, and broadcasting start/end date and time of each program, is acquired from the accompanying information data.

The video processing unit 109 includes a video data processing unit 109a and a video display unit 109b. For example, the video data processing unit 109a performs format conversion and a process of superimposing a menu or other on-screen display (OSD) data for the video data input from the decoder unit 108c or the video input interface 105a, the video data received by the communication unit 106, or the video data reproduced from the storage unit 104 if necessary. The video display unit 109b is a display device, such as a liquid crystal panel, and displays the video processed by the video data processing unit 109a.

The voice processing unit 110 includes a voice data processing unit 110a and a voice output unit 110b. The voice data processing unit 110a performs a process, such as format conversion, for the voice data input from the decoder unit 108c or the voice input interface 105b, the voice data received by the communication unit 106, or the voice data reproduced from the storage unit 104 if necessary. The voice output unit 110b is, for example, a speaker and outputs the voice processed by the voice data processing unit 110a.

Figure 2B:
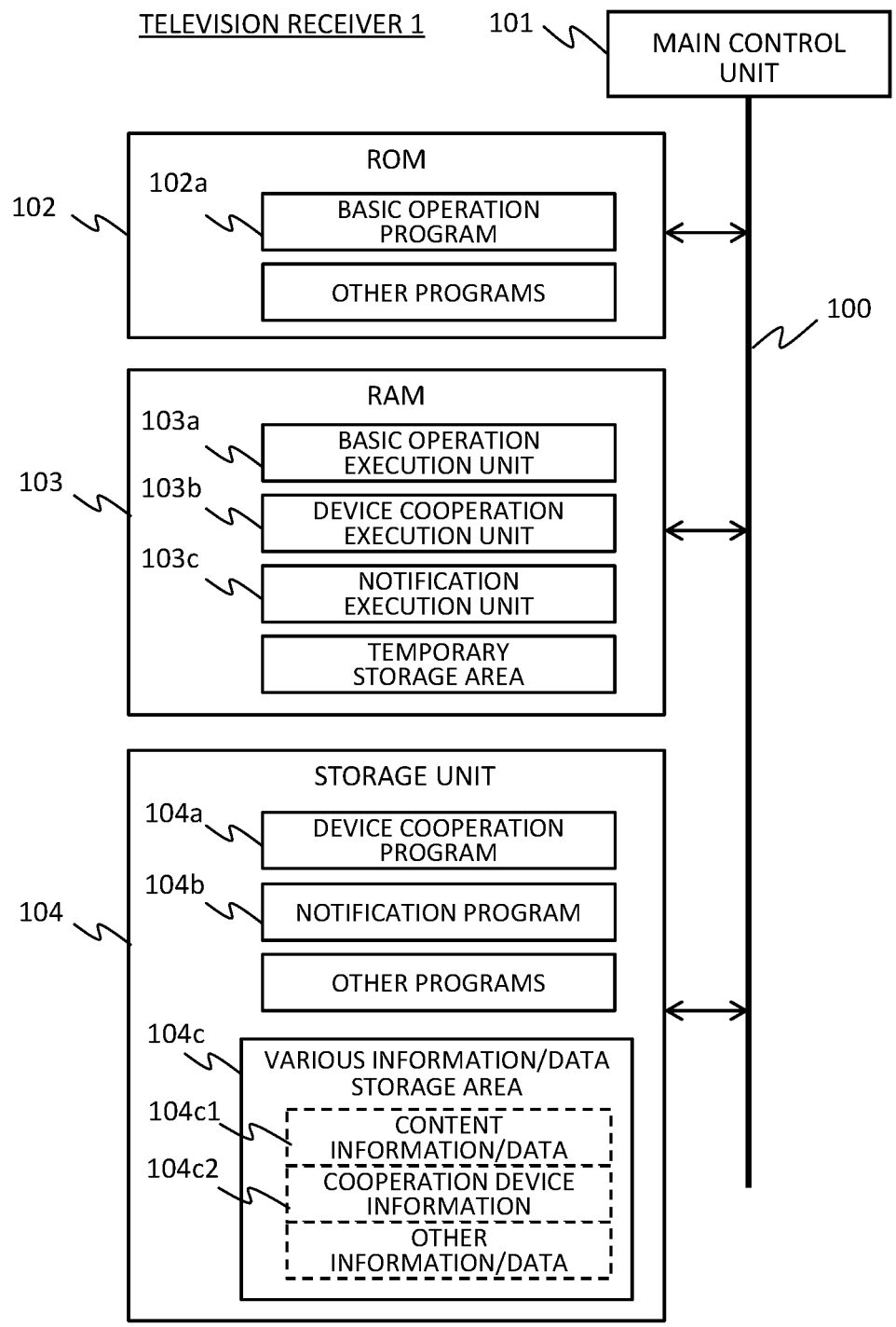
FIG. 2B is a diagram illustrating an example of the software configuration of the television receiver 1.

FIG. 2B is a diagram illustrating an example of the software configuration of the television receiver 1 and illustrates the software configuration of the ROM 102, the RAM 103, and the storage unit 104.

A basic operation program 102a and other operation programs are stored in the ROM 102. A device cooperation program 104a, a notification program 104b, and other operation programs are stored in the storage unit 104. In addition, the storage unit 104 has a various information/data storage area 104c and stores content information/data 104c1, such as recording information and data of a television broadcast program or information and data of content, such as a video or voice acquired from the communication unit 106 through the Internet, cooperation device information 104c2 related to the portable terminal device 2 that transmits and receives information through the communication unit 106, and other information/data.

The basic operation program 102a stored in the ROM 102 is expanded in the RAM 103. In addition, the main control unit 101 executes the expanded basic operation program to implement a basic operation execution unit 103a. Further, each of the device cooperation program 104a and the notification program 104b stored in the storage unit 104 is expanded in the RAM 103. The main control unit 101 executes each of the expanded operation programs to implement a device cooperation execution unit 103b and a notification execution unit 103c. In addition, the RAM 103 has a temporary storage area that temporarily stores data created in a case where each operation program is executed if necessary.

The device cooperation execution unit 103b performs a pairing process with the portable terminal device 2 that performs a cooperation operation and controls a transmitting/receiving operation for the portable terminal device 2. In addition, the notification execution unit 103c performs control in a case where incoming call information received from the portable terminal device 2 is displayed on the video display unit 109b.

Figure 3A:
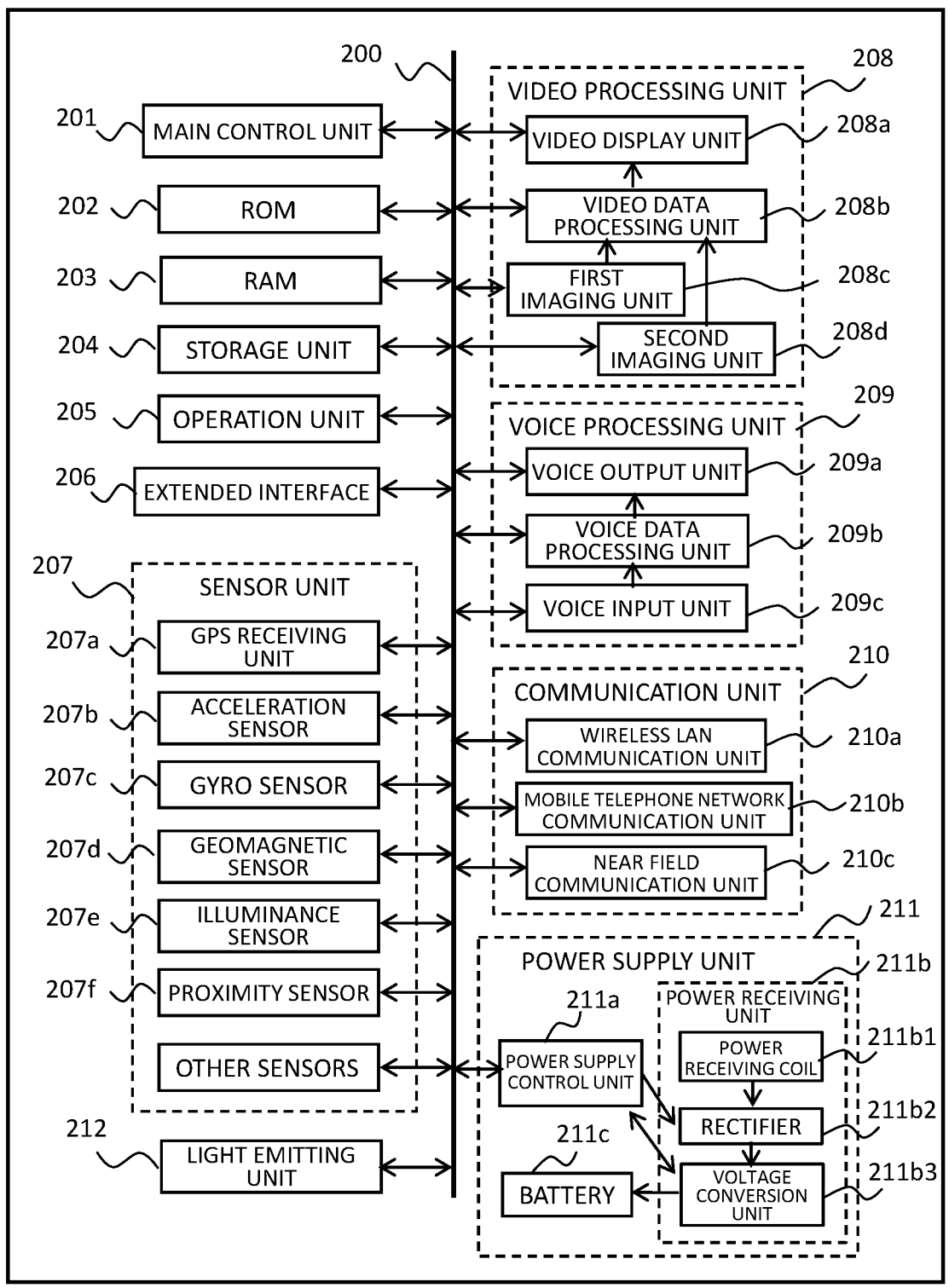
FIG. 3A is a block diagram illustrating an example of the configuration of a portable terminal device 2.

FIG. 3A is a block diagram illustrating an example of the configuration of the portable terminal device 2. The portable terminal device 2 (2a and 2b) includes a system bus 200, a main control unit 201, a ROM 202, a RAM 203, a storage unit 204, an operation unit 205, an extended interface unit 206, a sensor unit 207, a video processing unit 208, a voice processing unit 209, a communication unit 210, a power supply unit 211, and a light emitting unit 212. The portable terminal device 2 corresponds to a portable digital device having call and mail functions, such as a personal digital assistant (PDA) or a tablet personal computer (PC), in addition to a mobile phone or a smart phone.

The main control unit 201 is a microprocessor unit that controls the overall operation of the portable terminal device 2 according to a predetermined program. The system bus 200 is a data communication path for transmitting and receiving data between the main control unit 201 and each unit of the portable terminal device 2.

The ROM 202 is a memory that stores a basic operation program, such as an operating system, and other application programs and is, for example, a rewritable ROM, such as an EEPROM or a flash ROM. It is assumed that the program stored in the ROM 202 is updated to increase the version of the basic operation program or other application programs or to extend the functions of the programs.

The RAM 203 functions as a work area in a case where the basic operation program or other application programs are executed. The ROM 202 and the RAM 203 may be integrated with the main control unit 201. In addition, the ROM 202 may not be independently configured as illustrated in FIG. 3M and a partial storage area of the storage unit 204 may be used as the ROM 202. Further, it is assumed that the RAM 203 has a temporary storage area which temporarily stores data if necessary in a case where the basic operation program or various application programs are executed.

The storage unit 204 has an area that stores application programs for implementing various functions of the portable terminal device 2, such as a call function, a mail function, a Web browser function, and a map search function, various kinds of setting information of the portable terminal device 2, and various kinds of setting information and data of each application.

All or some of the functions of the ROM 202 may be replaced by a partial area of the storage unit 204. In addition, the storage unit 204 needs to hold the stored information even in a state in which no power is supplied to the portable terminal device 2. Therefore, a device, such as a flash ROM, an SSD, or an HDD, is used.

The operation unit 205 is an instruction input unit that inputs an operation instruction to the portable terminal device 2 and includes a touch panel 205$t$ that is provided so as to overlap a video display unit 208$a$ and an operation key 205$k$ in which button switches are arranged.

The extended interface unit 206 is an interface group for extending the functions of the portable terminal device 2 and it is assumed that the extended interface unit 206 is, for example, a USB interface or a memory interface. The USB interface connects a keyboard or other USB devices. The memory interface connects a memory card or other memory media to transmit and receive data. In addition, the USB interface is used to supply power for charging the battery 211$c$.

The sensor unit 207 is a sensor group for detecting the state of the portable terminal device 2 and includes a global positioning system (GPS) receiving unit 207$a$, an acceleration sensor 207$b$, a gyro sensor 207$c$, a geomagnetic sensor 207$d$, an illuminance sensor 207$e$, and a proximity sensor 207$f$ in this embodiment. For example, the position, movement, inclination, and direction of the portable terminal device 2, brightness around the portable terminal device 2, and the proximity situation of surrounding objects can be detected by these sensor groups. In addition, the sensor unit 207 may include other sensors. The acceleration sensor 207$b$ can detect acceleration in three axes, that is, the left-right direction (X-axis), the up-down direction (Y-axis), and the front-rear direction (Z-axis) of the portable terminal device 2 and can detect the inclination or posture of the portable terminal device 2.

The video processing unit 208 includes the video display unit 208$a$, a video data processing unit 208$b$, a first imaging unit 208$c$, and a second imaging unit 208$d$. The video display unit 208$a$ is a display device, such as a liquid crystal panel, and provides video data processed by the video data processing unit 208$b$ to the user of the portable terminal device 2. The video data processing unit 208$b$ includes a video RAM (not illustrated) and the video display unit 208$a$ is driven on the basis of video data input to the video RAM. In addition, it is assumed that the video data processing unit 208$b$ has a function of performing, for example, format conversion and a process of superimposing a menu or other OSD data if necessary.

The first imaging unit 208$c$ and the second imaging unit 208$d$ are camera units using an electronic device, such as a charge coupled device (CCD) or a complementary metal oxide semiconductor (CMOS) sensor, and convert light input from a lens into an electric signal to acquire video data of surroundings or a target object. Here, the first and second imaging units acquire the videos of the front and rear sides of the portable terminal device 2, respectively. In addition, the light emitting unit 212 is a flash for illumination in a case where the second imaging unit 208$d$ captures images.

The voice processing unit 209 includes a voice output unit 209$a$, a voice data processing unit 209$b$, and a voice input unit 209$c$. The voice output unit 209$a$ is, for example, a speaker and provides voice data processed by the voice data processing unit 209$b$ to the user of the portable terminal device 2. The voice input unit 209$c$ is a microphone, inputs, for example, the user's voice, and converts the voice into voice data.

The communication unit 210 includes a wireless LAN communication unit 210$a$, a mobile telephone network communication unit 210$b$, and a near field communication unit 210$c$ using, for example, a Bluetooth (registered trademark) system. The wireless LAN communication unit 210$a$ is connected to the router 5 by wireless communication and transmits and receives data. The mobile telephone network communication unit 210$b$ performs telephone communication (call) and data transmission/reception using wireless communication with the base station 6 of the mobile telephone network. The near field communication unit 210$c$ performs wireless communication with a cooperating device (television receiver 1). It is assumed that each of the wireless LAN communication unit 210$a$, the mobile telephone network communication unit 210$b$, and the near field communication unit 210$c$ includes, for example, an encoding circuit, a decoding circuit, and an antenna. In addition, the communication unit 210 may include, for example, an infrared communication unit.

The power supply unit 211 includes a power supply control unit 211$a$, a power receiving unit 211$b$, and a battery 211$c$. The power receiving unit 211$b$ includes a power receiving coil 211$b$1, a rectifier 211$b$2, and a voltage conversion unit 211$b$3. An induced current is generated in the power receiving coil 211$b$1 by magnetic coupling between a power transmitting coil (not illustrated) of the charging device 3 and the power receiving coil 211$b$1 of the power receiving unit and power is transmitted. For example, in a case where the generation of an induced current in the power receiving coil 211$b$1 is detected, the power supply control unit 211$a$ can determine that the portable terminal device 2 has been placed in the chargeable range of the charging device 3. The rectifier 211$b$2 rectifier the current induced in the power receiving coil 211$b$1 and the voltage conversion unit 211$b$3 converts the rectified current into a predetermined voltage. Then, the battery 211$c$ is charged. For example, the power supply control unit 211$a$ detects a charging current from the voltage conversion unit 211$b$3 to the battery 211$c$ to detect a charging state. In a case where the charging current is equal to or less than a predetermined charging current, the power supply control unit 211$a$ determines that the battery 211$c$ has been fully charged and ends the charging of the battery 211$c$ with the charging current from the voltage conversion unit 211$b$3 such that the battery 211$c$ is not overcharged.

Figure 3B:
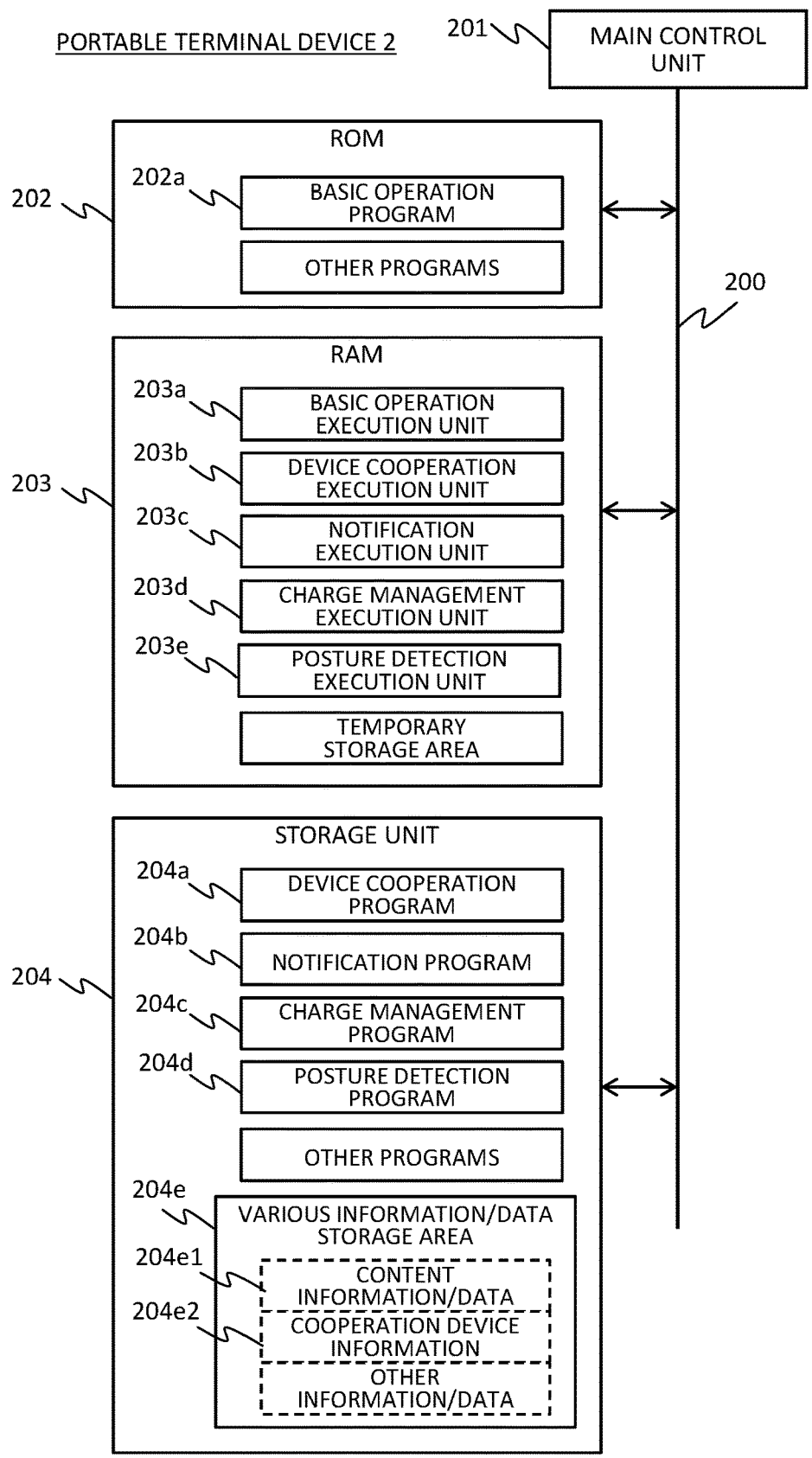
FIG. 3B is a diagram illustrating an example of the software configuration of the portable terminal device 2.

FIG. 3B is a diagram illustrating an example of the software configuration of the portable terminal device 2 and illustrates the software configuration of the ROM 202, the RAM 203, and the storage unit 204.

A basic operation program 202$a$ and other operation programs are stored in the ROM 202. A device cooperation program 204a, a notification program 204b, a charging management program 204c, a posture detection program 204d, and other operation programs are stored in the storage unit 204. In addition, the storage unit 204 has a various information/data storage area 204e and stores content information/data 204e1 of a video or voice acquired from the communication unit 210 through the Internet, cooperation device information 204e2 related to a device (television receiver 1) that transmits and receives information through the communication unit 210, and other information/data.

The basic operation program 202a stored in the ROM 202 is expanded in the RAM 203. In addition, the main control unit 201 executes the expanded basic operation program to implement a basic operation execution unit 203a. Further, each of the device cooperation program 204a, the notification program 204b, the charging management program 204c, and the posture detection program 204d stored in the storage unit 204 is expanded in the RAM 203. The main control unit 201 executes each of the expanded operation programs to implement a device cooperation execution unit 203b, a notification execution unit 203c, a charging management execution unit 203d, and a posture detection execution unit 203e. In addition, the RAM 203 has a temporary storage area that temporarily stores data created in a case where each operation program is executed if necessary.

The device cooperation execution unit 203b performs a pairing process with the television receiver 1 or the charging device 3 that performs a cooperation operation and controls a transmitting/receiving operation for the television receiver 1. In addition, the notification execution unit 203c controls an operation of notifying the cooperating television receiver 1 of the information of a phone call or mail received through the communication unit 210. The charging management execution unit 203d controls a charging operation of the charging device 3. The posture detection execution unit 203e performs an operation of detecting the posture of the portable terminal device 2.

Figure 4:
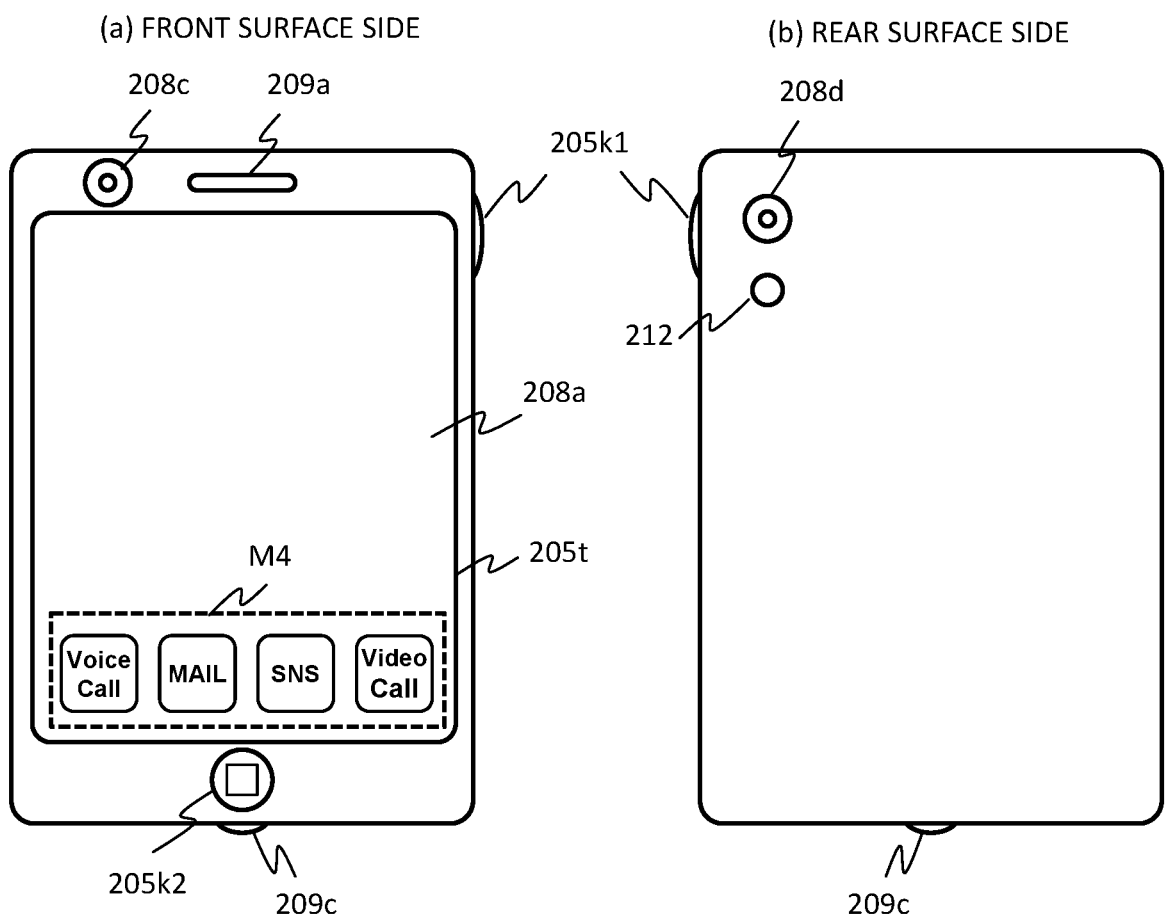
FIG. 4 is a diagram illustrating an example of the outward appearance of the portable terminal device 2.

FIG. 4 is a diagram illustrating an example of the outward appearance of the portable terminal device 2. Here, FIG. 4 illustrates an example in a case where the portable terminal device 2 is a smart phone. In FIG. 4, (a) illustrates the outward appearance of a front surface side (video display side) and (b) illustrates the outward appearance of a rear surface side.

For example, the video display unit 208a and the first imaging unit (camera) 208c are arranged on the front surface side in (a) and the second imaging unit (camera) 208d and the light emitting unit 212 are arranged on the rear surface side in (b). The touch panel 205t is integrated with the video display unit 208a. In addition, the voice output unit (speaker) 209a is arranged in an upper part of the terminal and the voice input unit (microphone) 209c is arranged in a lower part of the terminal. A power key 205k1 is arranged on a side surface. The power key 205k1 is pressed for a predetermined period of time or more to turn on and off power. A home key 205k2 is used to display a basic operation screen on the video display unit 208a. An icon M4 corresponding to applications, such as a voice call and mail, executed by the portable terminal device 2 is displayed. In a state in which an application, such as a Web browser, is displayed, the home key 205k2 is pressed to switch the display of the basic operation screen.

Hereinafter, the operation of the portable terminal device 2 notifying the television receiver 1 of incoming call information will be described. In the operation, the television receiver 1 and the portable terminal device 2 cooperate with each other. It is highly likely that the portable terminal device 2 needs to notify the television receiver 1 of the incoming call information in a case where the portable terminal device 2 is separated from the user's hands for a charging operation. Therefore, the charging operation and the incoming call notification operation will be described below in association with each other.

In Embodiment 1, a privacy protection mode is set according to the posture of the portable terminal device 2 at the time of charging in order to protect the privacy of the user in the notification of an incoming call. For example, the portable terminal device 2 is placed with respect to the charging device 3 such that the video display unit 208a faces downward (the charging device 3) to turn on the privacy protection mode. In this case, the incoming call information notified from the portable terminal device 2 to the television receiver 1 is limited (for example, information related to the other party is removed) to protect the privacy of the user.

Figure 5:
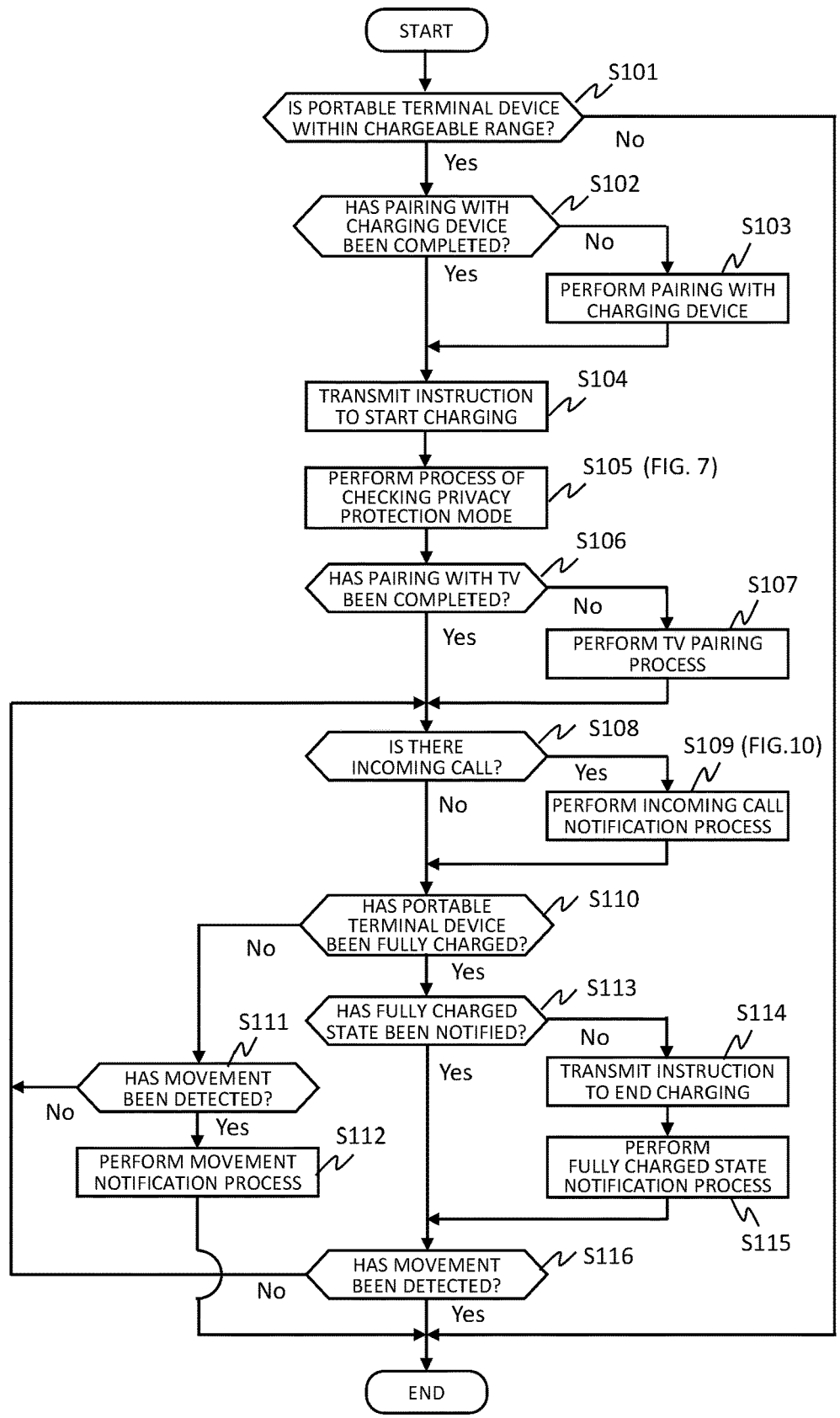
FIG. 5 is a flowchart illustrating an example of a charging and incoming call notification operation of the portable terminal device 2.

FIG. 5 is a flowchart illustrating an example of the charging and incoming call notification operation of the portable terminal device 2. This process is mainly performed by the notification execution unit 203c and the charging management execution unit 203d. Hereinafter, the process will be described step by step.

S101: It is determined whether or not the portable terminal device 2 has been placed in the chargeable range of the charging device 3 on the basis of whether or not the power supply control unit 211a of the power supply unit 211 has detected an induced current. In a case where the portable terminal device 2 is determined to be placed in the chargeable range (Yes), the process proceeds to S102. In a case where the portable terminal device 2 is determined not to be placed in the chargeable range (No), the process ends.

S102: It is determined whether or not the device cooperation execution unit 203b has completed a pairing process with the charging device 3. In a case where pairing with the charging device 3 has been completed (Yes), the process proceeds to S104. In a case where pairing with the charging device 3 has not been completed (No), the process proceeds to S103.

S103: The device cooperation execution unit 203b performs a pairing process with the charging device 3 using, for example, a known method such as a method for inputting authentication numbers.

S104: The charging management execution unit 203d transmits a charging start instruction to the charging device 3. Then, the charging device 3 controls the current of the power transmitting coil such that a predetermined induced current is generated in the power receiving coil 211b1 of the portable terminal device 2. Then, charging device 3 starts charging.

S105: The portable terminal device 2 performs a process of checking whether "the privacy protection mode is turned on". The term "privacy protection mode" is a mode in which, in a case where a call is received, the notification of the call to the television receiver 1 is limited, which will be described below. The details of S105 will be described with reference to FIG. 7.

S106: It is determined whether or not the device cooperation execution unit 203b has completed a pairing process with the television receiver 1. In a case where pairing with the television receiver 1 has been completed (Yes), the process proceeds to S108. In a case where pairing with the television receiver 1 has not been completed (No), the process proceeds to S107.

S107: The device cooperation execution unit 203b performs a pairing process with the television receiver 1 through the near field communication unit 210c using, for example, a known method such as a method for inputting authentication numbers. In addition, in a case where the television receiver 1 is turned off or is in a standby state in the pairing process (in a case where there is no response from the television receiver 1 at the time of the pairing process using near field communication), for example, a command corresponding to Wake on LAN (WOL) is transmitted from the wireless LAN communication unit 210a to the LAN communication unit 106a of the television receiver 1 to turn on the television receiver 1.

S108: The mobile telephone network communication unit 210b receives radio waves from the base station 6 or the wireless LAN communication unit 210a receives radio waves from the router 5 and it is determined whether or not a call, such as a voice call, a video call using a video and voice, mail, or a social networking service (SNS), is received. In a case where there is an incoming call (Yes), the process proceeds to S109. In a case where there is no incoming call (No), the process proceeds to S110.

S109: The notification execution unit 203c performs an incoming call notification process corresponding to the privacy protection mode to notify the television receiver 1 subjected to the pairing process of incoming call information. The details of S109 will be described with reference to FIG. 10.

S110: The power supply control unit 211a detects a charging current to detect a charging state and determines whether or not the portable terminal device 2 is in a fully charged state. In a case where the portable terminal device 2 is in the fully charged state (Yes), the process proceeds to S113. In a case where the portable terminal device 2 is not in the fully charged state (No), the process proceeds to S111.

S111: It is determined whether or not the portable terminal device 2 has been moved from the chargeable range of the charging device 3. In a case where the movement is detected (Yes), the process proceeds to S112. In a case where the movement is not detected (No), the process returns to S108. Whether or not the portable terminal device 2 has been moved from the chargeable range of the charging device 3 is determined by, for example, detecting the output of the acceleration sensor 207b or by detecting an induced current generated in the power receiving coil 211b1.

S112: The notification execution unit 203c notifies the television receiver 1 subjected to the pairing process that the portable terminal device 2 has been moved from the chargeable range of the charging device 3. The charging operation of the charging management execution unit 203d ends.

Figure 6:
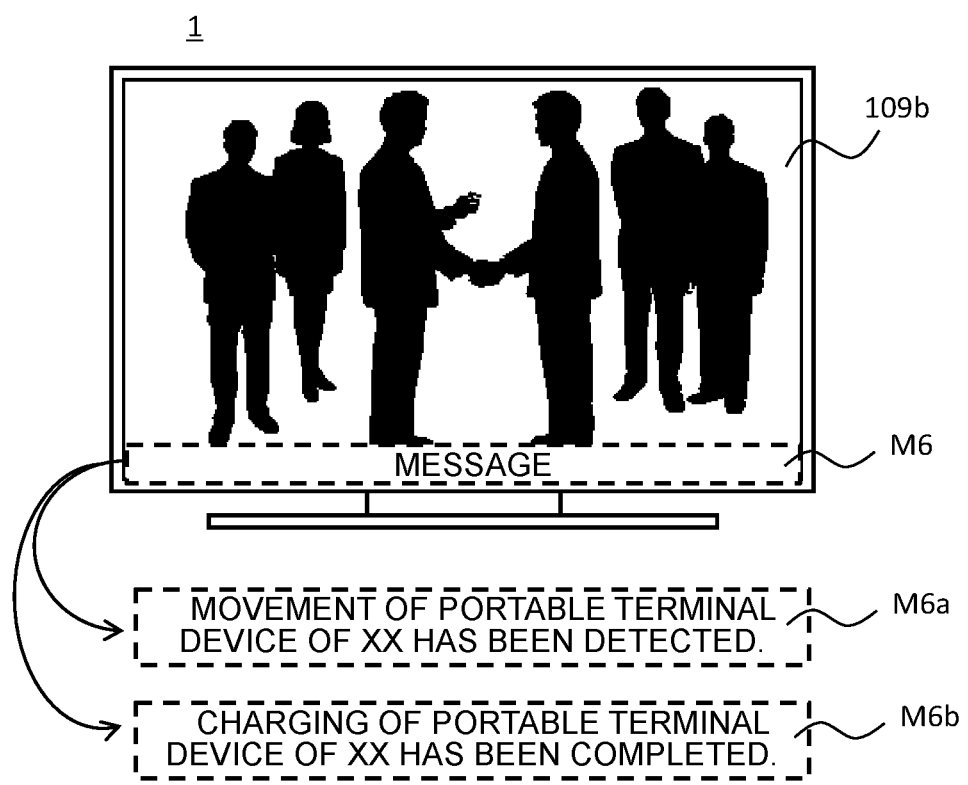
FIG. 6 is a diagram illustrating an example in which a charging state of the portable terminal device 2 is displayed on the television receiver 1.

FIG. 6 is a diagram illustrating an example in which the charging state of the portable terminal device 2 is displayed on the television receiver 1. In a case where the notification process in S112 is received, the television receiver 1 displays the information of the portable terminal device 2 whose movement has been detected and a message M6a indicating that the portable terminal device 2 has been moved on the video display unit 109b. With this configuration, it is possible to know that the portable terminal device 2 has been moved from the chargeable range of the charging device 3 even in a case where the portable terminal device 2 has been moved, without the intention of the user, before the portable terminal device 2 is fully charged.

S113: It is determined whether or not the charging device 3 and the television receiver 1 subjected to the pairing process have been notified that the portable terminal device 2 is in a fully charged state. In a case where the charging device 3 and the television receiver 1 have been notified (Yes), the process proceeds to S116. In a case where the charging device 3 and the television receiver 1 have not been notified (No), the process proceeds to S114.

S114: The charging management execution unit 203d transmits a charging end instruction to the charging device 3. Then, the charging device 3 sets the current of the power transmitting coil to be equal to or less than a predetermined current and ends charging.

S115: The notification execution unit 203c notifies the television receiver 1 subjected to the pairing process that charging has been completed.

For example, as illustrated in FIG. 6, the television receiver 1 displays a message M6b for notifying the information of the portable terminal device 2 whose charging has been completed on the video display unit 109b on the basis of the notification in S115.

S116: It is determined whether or not the portable terminal device 2 has been moved from the chargeable range of the charging device 3. In a case where the movement is detected (Yes), the charging operation of the charging management execution unit 203d ends. In a case where the movement is detected (No), the process returns to S108. Then, the above-mentioned process is repeated. Therefore, in a case where a call received in a state in which the portable terminal device 2 is placed within the chargeable range of the charging device 3 after charging is completed, it is possible to notify the television receiver 1 that a call has been received.

Next, privacy protection in incoming call notification will be described in detail.

FIG. 7 is a flowchart illustrating the details of the privacy protection mode check process (S105) in FIG. 5. Here, it is assumed that the posture detection execution unit 203e detects the posture of the portable terminal device 2 using the acceleration sensor 207b to check the privacy protection mode.

FIG. 8 is a diagram illustrating an example of the relationship between the posture of the portable terminal device 2 and the privacy protection mode. That is, as illustrated in (a), the privacy protection mode is turned off at the posture where the portable terminal device 2 is placed with respect to the charging device 3 such that the video display unit 208a faces upward. In contrast, as illustrated in (b), the privacy protection mode is turned on at the posture where the portable terminal device 2 is placed with respect to the charging device 3 such that the video display unit 208a faces downward. Hereinafter, the flow of FIG. 7 will be described step by step.

S201: The acceleration sensor 207b detects posture data of the portable terminal device 2. The acceleration sensor 207b can acquire acceleration (gravity acceleration) data in three axes, that is, the left-right direction (X-axis), the up-down direction (Y-axis), and the front-rear direction (Z-axis) of the portable terminal device 2 illustrated in FIG. 8.

S202: The posture of the portable terminal device 2 with respect to the charging device 3 is determined from the acquired data of the acceleration sensor 207b. Specifically, in a case where the charging device 3 is horizontally provided (in the XY plane), it is possible to determine whether the video display unit 208a faces upward or downward with respect to the charging device 3 on the basis of acceleration data in the Z-axis direction.

S203: A branch process is performed on the basis of the determined direction of the video display unit 208a. In a case where the video display unit 208a faces upward, the process proceeds to S204. In a case where the video display unit 208a faces downward, the process proceeds to S205.

S204: The privacy protection mode is turned off and the process ends.

S205: The privacy protection mode is turned on and the process ends.

As described above, in a case where the user places the portable terminal device 2 on the charging device 3, the user can easily set the turn-on and turn-off of the privacy protection mode by selecting whether to place the portable terminal device 2 such that the video display unit 208a faces upward or downward.

In the example illustrated in FIG. 8, the charging device 3 is horizontally provided and the acceleration data of the portable terminal device 2 in the front-rear direction (Z-axis) is detected. However, the invention is not limited thereto.

Figure 9:
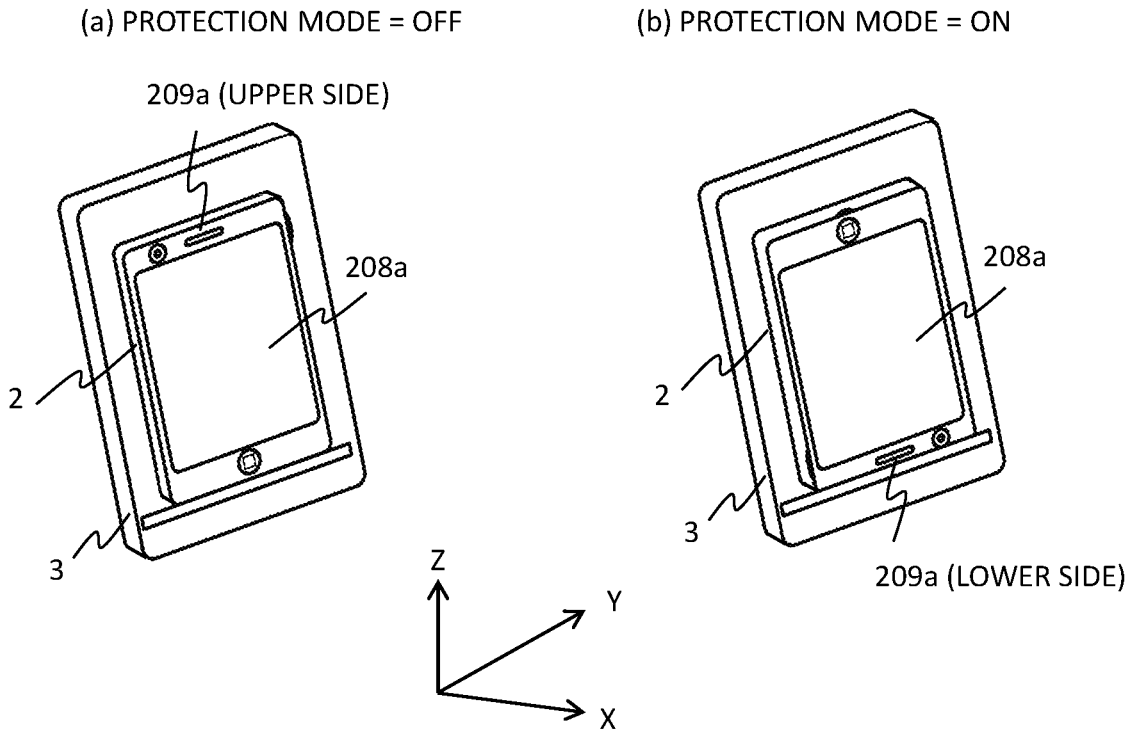
FIG. 9 is a diagram illustrating another example of the relationship between the posture of the portable terminal device 2 and the privacy protection mode.

FIG. 9 is a diagram illustrating another example of the relationship between the posture of the portable terminal device 2 and the privacy protection mode. Here, charging is performed with the charging device 3 and the portable terminal device 2 standing upright. In a case where the portable terminal device 2 is in an upright state (the voice output unit 209a is on the upper side) as illustrated in (a), the privacy protection mode is turned off, without depending on the direction of the video display unit 208a. In addition, in a case where the portable terminal device 2 is in an inverted state (the voice output unit 209a is on the lower side), the privacy protection mode is turned on. Acceleration data in the up-down direction (Y-axis) may be used to determine the posture.

Further, the voice output unit 209a may output a voice message "Notify that the privacy protection mode has been turned on" or a message indicating a set state may be displayed on the video display unit 208a such that the user can check whether or not the privacy protection mode has been set as intended by the user.

Figure 10:
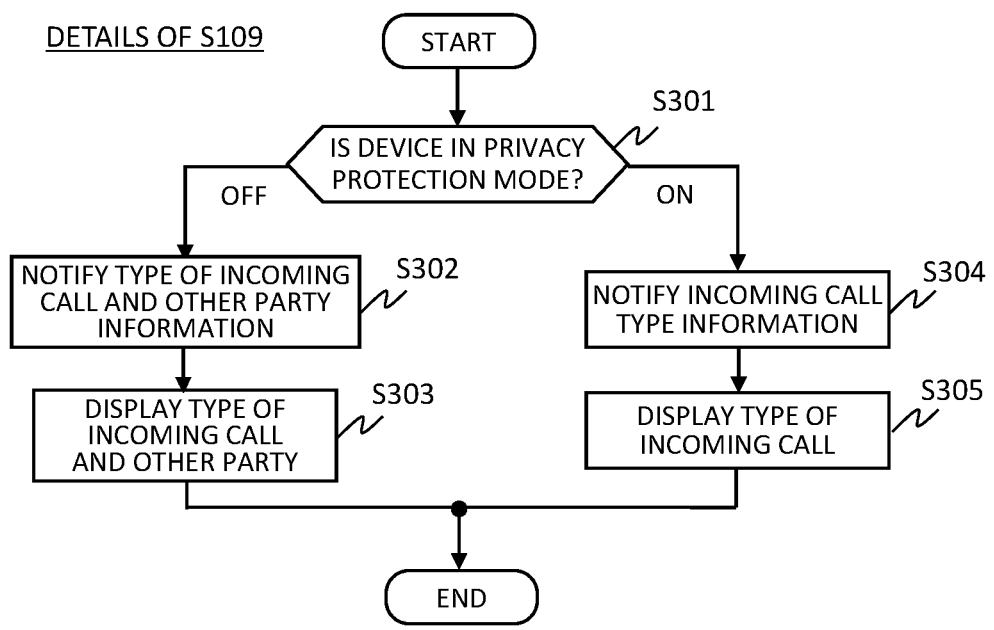
FIG. 10 is a flowchart illustrating the details of an incoming call notification process (S109) in FIG. 5.

FIG. 10 is a flowchart illustrating the details of the incoming call notification process (S109) in FIG. 5. Here, the content of the notification to the television receiver 1 and the content of the incoming call displayed on the video display unit 208a of the portable terminal device 2 are changed according to the privacy protection mode checked by the privacy protection mode check process (S105). Hereinafter, the process will be described step by step.

S301: A branch process is performed according to the privacy protection mode checked by the privacy protection mode check process S105. In a case where the privacy protection mode is turned off, the process proceeds to S302. In a case where the privacy protection mode is turned on, the process proceeds to S304.

S302: The notification execution unit 203c notifies the television receiver 1 subjected to the pairing process of the type of incoming call (for example, the reception of a voice call, the reception of a video call using a video and voice, mail, or SNS) and the information of the other party (for example, the registered name, phone number, or mail address of the other party) as the incoming call information.

Figure 11:
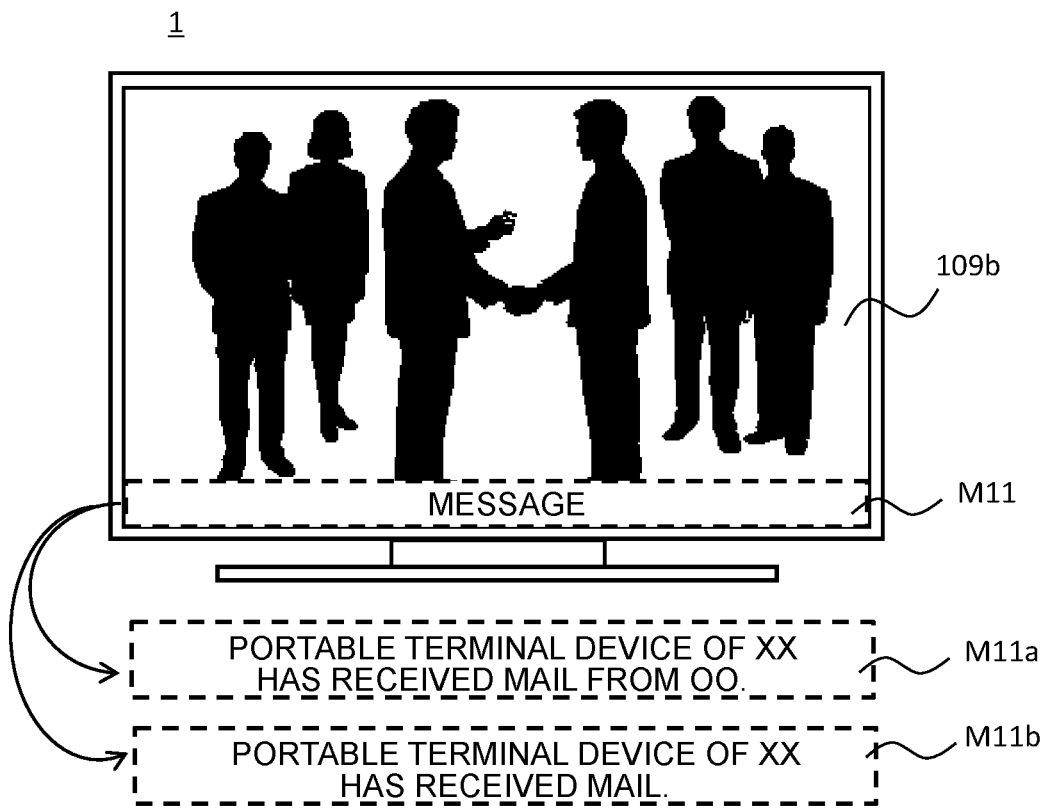
FIG. 11 is a diagram illustrating an example in which the notification of a received call by the portable terminal device 2 is displayed on the television receiver 1.

FIG. 11 is a diagram illustrating an example in which the notification of a received call by the portable terminal device 2 is displayed on the television receiver 1.

In the television receiver 1, a message M11a indicating the information (for example, the name of the user of the terminal or the name of the terminal) of the portable terminal device 2 that has transmitted the notification, the information of the other party, and the type of incoming call is displayed on the video display unit 109b on the basis of the notification in S302.

Figure 12:
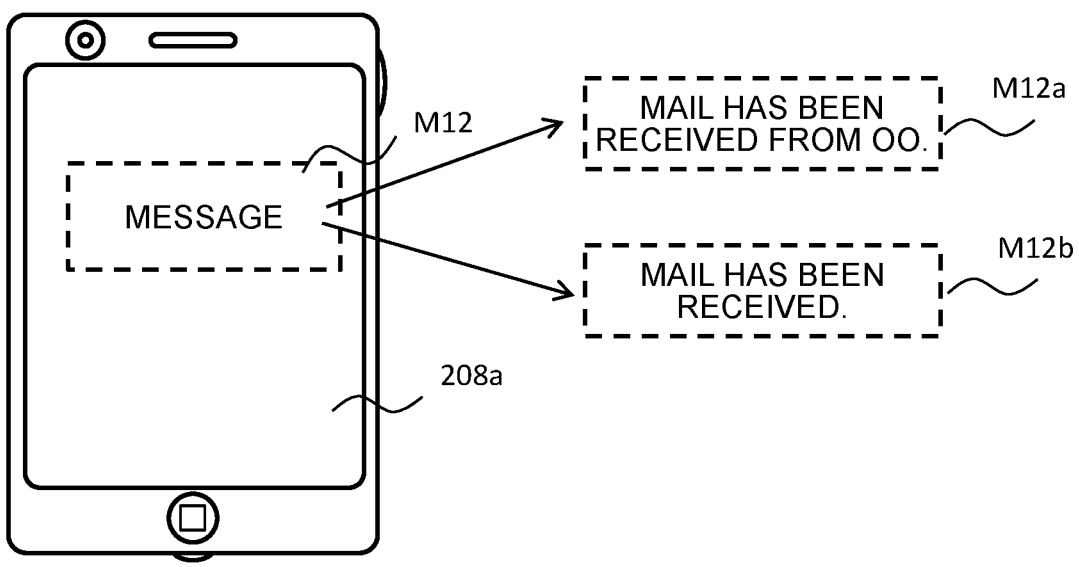
FIG. 12 is a diagram illustrating an example in which the notification of a received call by the portable terminal device 2 is displayed on the portable terminal device 2.

S303: In contrast, as illustrated in the example of FIG. 12, a message M12a indicating the type of incoming call (for example, the reception of a voice call, the reception of a video call using a video and voice, mail, or SNS) and the other party is displayed on the video display unit 208a of the portable terminal device 2 and the process ends.

S304: The notification execution unit 203c notifies the television receiver 1 subjected to the pairing process of the information of the type of incoming call as the incoming call information.

In the television receiver 1, as illustrated in FIG. 11, a message M11b indicating the information of the portable terminal device 2 that has transmitted the notification and the type of incoming call is displayed on the video display unit 109b on the basis of the notification in S304. In the message M11b, the information of the other party included in the message M11a is removed.

S305: In contrast, as illustrated in the example of FIG. 12, a message M12b indicating the type of incoming call is displayed on the video display unit 208a of the portable terminal device 2 and the process ends. In the message M12b, the information of the other party included in the message M12a is removed.

In addition, the information of the type of incoming call may be the information of a received application, such as an application corresponding to a phone call, an application corresponding to mail, or a video call application, in the portable terminal device 2.

As described above, in Embodiment 1, the privacy protection mode is set according to the posture of the portable terminal device 2 and information related to an incoming call to be notified to the television receiver 1 is changed according to the setting of the privacy protection mode. Therefore, it is possible to check a call received by the portable terminal device 2 at the time of charging, using the television receiver 1, while ensuring the privacy of the user.

The following are possible as modification examples of Embodiment 1.

Modification Example 1-1

In Embodiment 1, the posture detection execution unit 203e detects the posture of the portable terminal device 2 on the basis of the output of the acceleration sensor 207b illustrated in FIG. 7. However, the invention is not limited thereto and the posture of the portable terminal device 2 may be detected by other methods.

For example, as illustrated in FIG. 4, the first imaging unit (camera) 208c or the second imaging unit (camera) 208d of the portable terminal device 2 may acquire a video and the posture may be detected on the basis of the brightness of the acquired video. That is, in a case where the portable terminal device 2 is placed on the charging device 3 as illustrated in FIG. 8(a), a video acquired by the second imaging unit 208d on the rear surface side is dark. In a case where the portable terminal device 2 is placed on the charging device 3 as illustrated in FIG. 8(b), a video acquired by the first imaging unit 208c is dark. In this way, it is possible to detect the posture. In addition, the brightness levels of both videos acquired by the first imaging unit 208c and the second imaging unit 208d may be compared to detect the posture.

In addition, for example, in a dark room, since both videos of the first and second imaging units 208c and 208d are dark, an error is likely to occur in posture detection. Therefore, in a case where a video is acquired by the second imaging unit 208d, the light emitting unit 212 provided on the same side may emit light. Alternatively, in a case where a video is acquired by the first imaging unit 208c, the video display unit 208a on the same side may emit light with a predetermined bright level or higher.

Further, the illuminance sensor 207e or the proximity sensor 207f may be provided on the front surface of the portable terminal device 2 and the posture may be detected on the basis of the detected illuminance or distance. In addition, the detection results of a plurality of sensors may be combined with each other to detect the posture.

Modification Example 1-2

In Embodiment 1, as illustrated in FIG. 10, in a case where the privacy protection mode is turned on, the information of the calling party is not notified to the television receiver 1. However, the invention is not limited thereto. For example, in a case where the privacy protection mode is turned on and a phone call (voice, or a video and voice) is received, the portable terminal device 2 may perform the same operation as an answering machine and may not notify the television receiver 1 of the received phone call. In addition, at that time, the portable terminal device 2 may be switched to the operation of the answering machine at the point of time when the number of calls is smaller than usual.

Embodiment 2

In Embodiment 2, the display of information related to the call received by a portable terminal device 2 is changed according to whether or not there is a person other than the user of the portable terminal device 2 which has notified a television receiver 1 of the reception of the call around the television receiver 1. That is, in Embodiment 2, the television receiver 1 controls privacy protection.

Figure 13A:
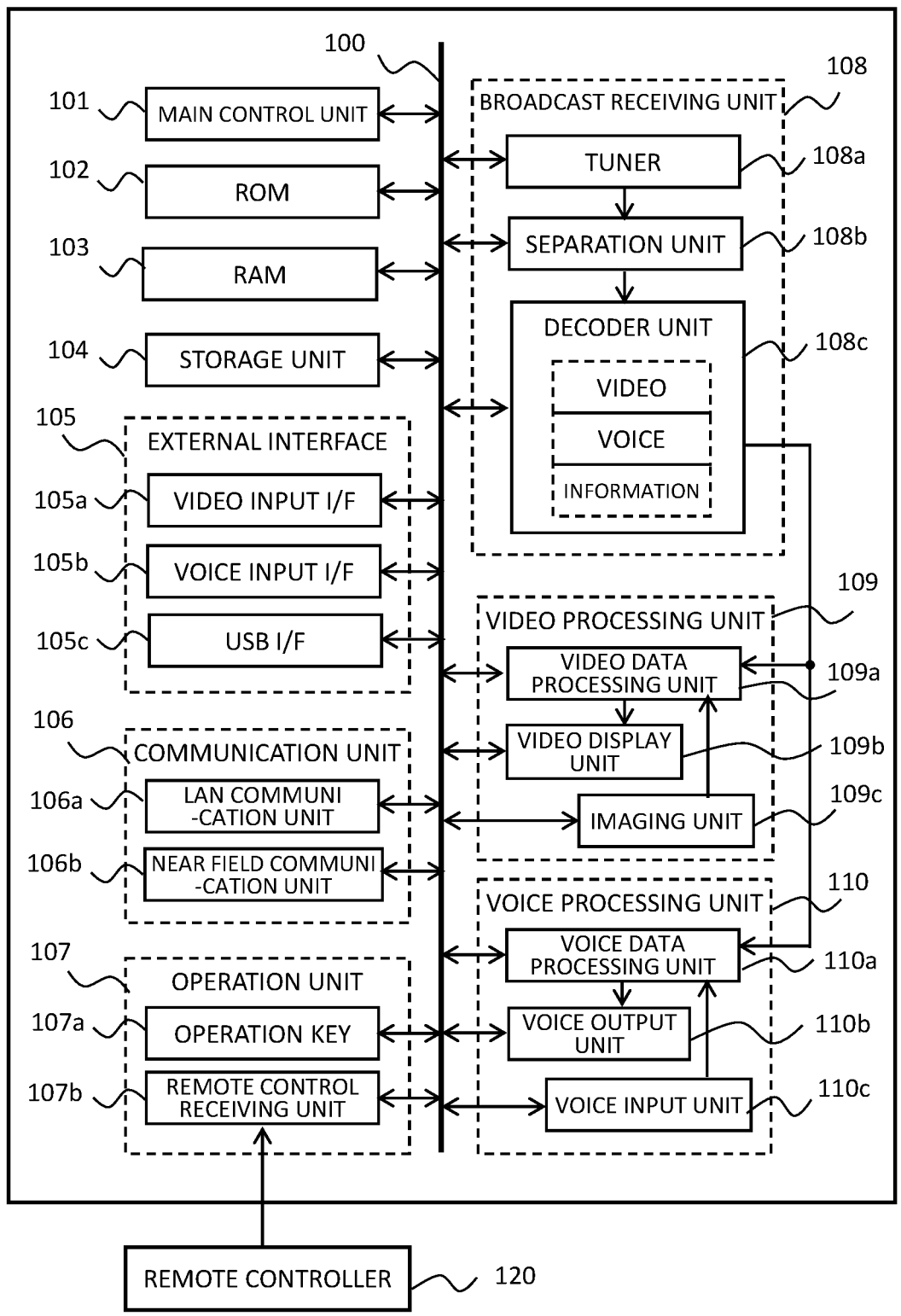
FIG. 13A is a block diagram illustrating an example of the configuration of a television receiver 1 (Embodiment 2).
Figure 13B:
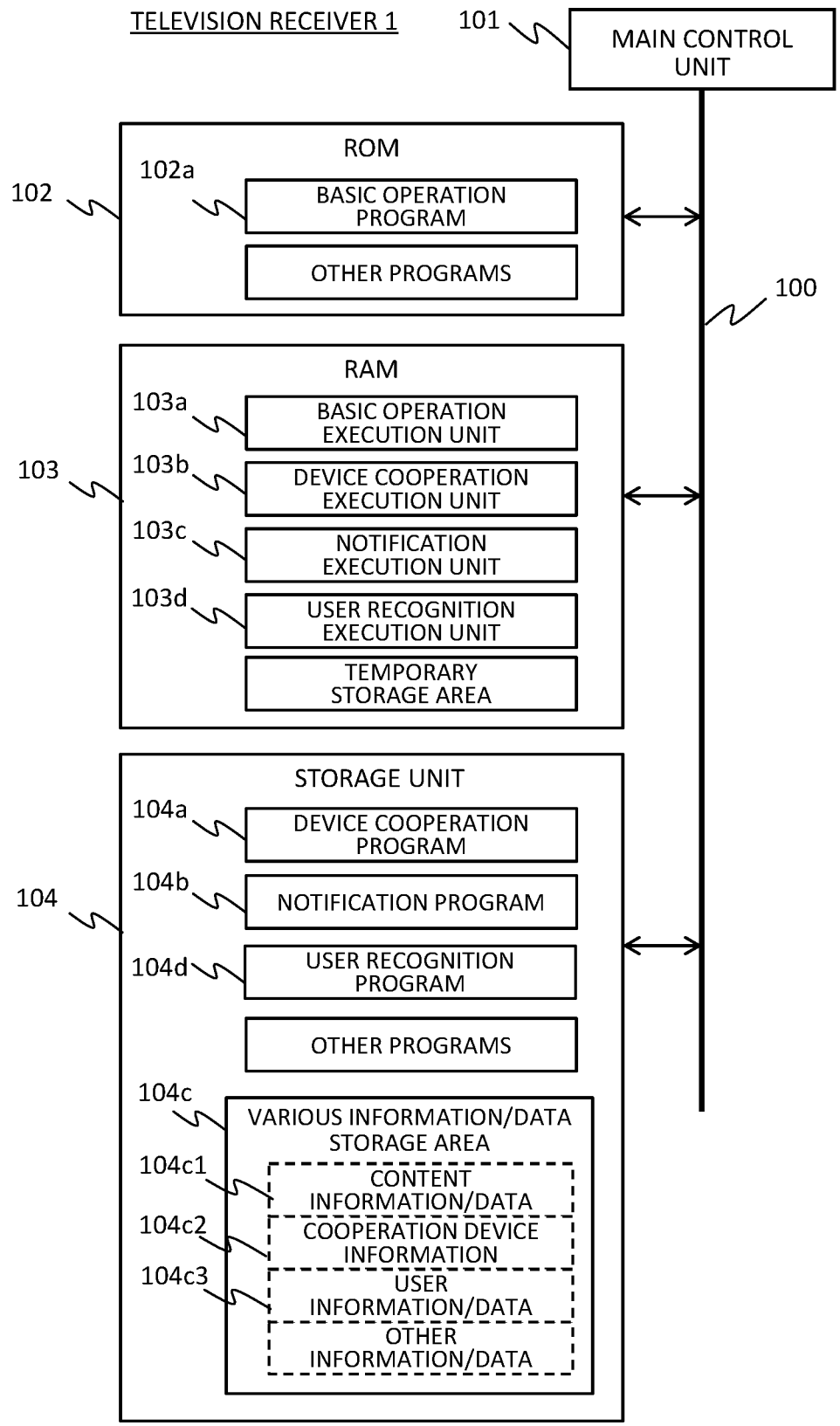
FIG. 13B is a diagram illustrating an example of the software configuration of the television receiver 1.

FIG. 13A is a block diagram illustrating an example of the configuration of the television receiver 1 according to Embodiment 2. In addition, FIG. 13B is a diagram illustrating an example of the software configuration of the television receiver 1 according to Embodiment 2. The configurations illustrated in FIGS. 13A and 13B are basically the same as the configurations illustrated in FIGS. 2A and 2B in Embodiment 1. Hereinafter, configuration parts different from those in Embodiment 1 will be described.

In FIG. 13A, an imaging unit (camera) 109c and a voice input unit (microphone) 110c are newly added. The imaging unit 109c converts light input from a lens into an electric signal using an electronic device, such as a CCD or a CMOS sensor, and inputs video data of surroundings or a target object. Then, a video of, for example, persons around the television receiver 1 is acquired and input to the video data processing unit 109a. In addition, the imaging unit 109c may be provided separately from the television receiver 1 and video data may be input (received) by the video input interface 105a or the communication unit 106.

The voice input unit 110c receives the voice of the person around the television receiver 1 and outputs the voice to the voice data processing unit 110a. In addition, the voice input unit 110c may be provided separately from the television receiver 1 and voice data may be input (received) by the voice input interface 105b or the communication unit 106.

In FIG. 13B, a user recognition program 104d is newly stored in the storage unit 104. The program is expanded in the RAM 103 and the main control unit 101 executes the program to implement a user recognition execution unit 103d. In addition, user information/data 104c3 is stored in a various information/data storage area 104c of the storage unit 104 and includes, for example, the registered name of the user, the information of the portable terminal device associated with the user, and face information of the user. The user recognition execution unit 103d performs an operation of recognizing the user on the basis of the video data captured by the imaging unit 109c and the face information of the user information/data 104c3.

In addition, the configuration of the portable terminal device 2 according to Embodiment 2 is similar to that in Embodiment 1 except an operation of notifying the television receiver 1 of an incoming call. In Embodiment 2, it is assumed that the privacy protection mode check process (S105) is not performed in the flowchart illustrating the charging/incoming call notification operation in FIG. 5. Further, in the branch process (S301) by the privacy protection mode in the flowchart illustrating the incoming call notification process (S109) in FIG. 10, in a case where the privacy protection mode is turned off, at least the type of incoming call and the information of the other party (the registered name, phone number, or mail address of the other party) are notified as incoming call information to the television receiver 1 subjected to a pairing process. This is because the television receiver 1 protects the privacy of the user.

Next, a new notification operation of the television receiver 1 according to Embodiment 2 will be described.

FIG. 14 is a flowchart illustrating an example of the notification operation of the television receiver 1. This process is mainly performed by the notification execution unit 103c and the user recognition execution unit 103d. Hereinafter, the process will be described step by step.

S401: The communication unit 106 of the television receiver 1 receives a notification including the type of incoming call and the information of the other party from the portable information terminal 2.

S402: The imaging unit 109c acquires a video of, for example, the user around the television receiver 1.

S403: The user recognition execution unit 103d recognizes persons around the television receiver 1 on the basis of the video acquired in S402 and the user information/data 104c3 of the storage unit 104.

S404: It is determined whether or not the persons around the television receiver 1 recognized in S403 include the user of the portable terminal device (terminal) 2 from which the notification has been received in S401. In a case where the persons include the user of the terminal from which the notification has been received (Yes), the process proceeds to S405. In a case where the persons do include the user of the terminal from which the notification has been received (No), the process ends and the television receiver 1 does not perform the notification operation.

S405: It is determined whether or not the person around the television receiver 1 recognized in S403 is only the user of the terminal from which the notification has been received, that is, whether or not there is a person other than the user of the terminal from which the notification has been received. In a case where the person is only the user of the terminal from which the notification has been received (Yes), the process proceeds to S406. In a case where there is a person other than the user of the terminal from which the notification has been received (No), the process proceeds to S407.

S406: As illustrated in the message M11a of FIG. 11, the information (for example, the name of the user of the terminal or the name of the terminal) of the portable terminal device 2 from which the notification has been received, the type of incoming call, and the information of the other party are displayed on the video display unit 109b and the process ends.

S407: As illustrated in the message M11b of FIG. 11, the information of the portable terminal device 2 from which the notification has been received and the received type of incoming call are displayed on the video display unit 109b and the process ends. Here, the information of the other party is not displayed.

As described above, in Embodiment 2, in a case where the television receiver 1 is notified of the reception of an incoming call by the portable terminal device 2, the television receiver 1 determines whether or not the user of the portable terminal device 2 is present around the television receiver 1 and whether or not there is a person other than the user, on the basis of the captured video. Then, in a case where the user of the terminal is absent, incoming call information is not displayed. In a case where there is another user other than the user of the terminal, the information of the other party (for example, the registered name, telephone number, and mail address of the other party), is not displayed. Therefore, it is possible to check an incoming call while ensuring the privacy of the user.

In addition, in a case where there are a plurality of television receivers 1, the portable terminal device 2 may notify all of the television receivers of the reception of an incoming call. In this case, each television receiver can perform user recognition and only the television receiver which has recognized the user of the portable terminal device 2 notified the incoming call can display incoming call information.

Embodiment 3

In Embodiment 3, after incoming call information from the portable terminal device 2 is displayed on the video display unit 109b of the television receiver 1, a phone call or mail with the other party is displayed by the television receiver 1. It is assumed that, for the display of the incoming call information by the television receiver 1, the privacy protection described in Embodiment 1 or Embodiment 2 is performed.

The configuration of the television receiver 1 according to Embodiment 3 is the same as that according to Embodiment 2 illustrated in FIG. 13A. In a case where a voice call or a call using a video and voice (hereinafter, referred to as a video call) is made, a phone call (call) is made to the other party by using the imaging unit 109c and the voice input unit 110c illustrated in FIG. 13A.

Figure 15:
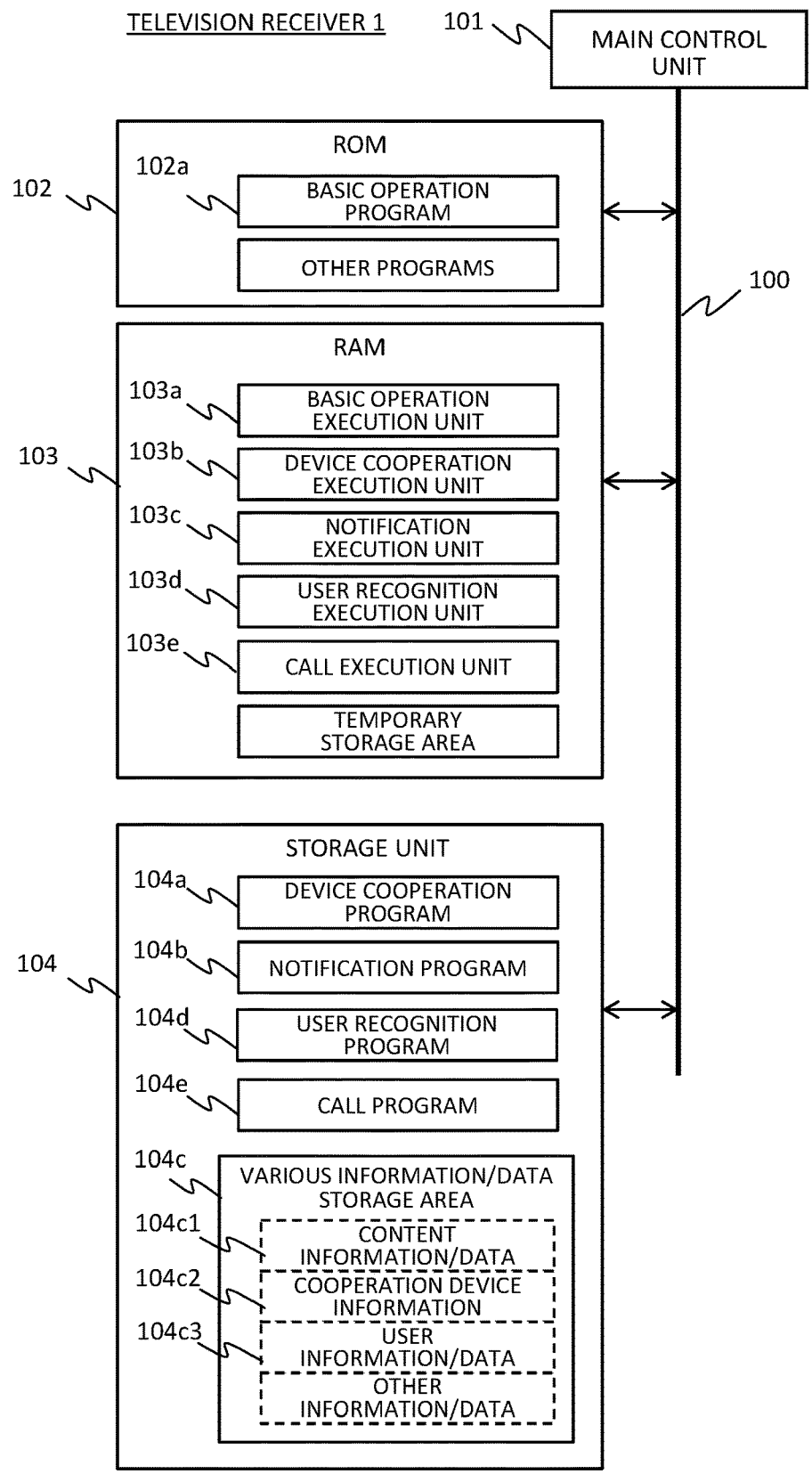
FIG. 15 is a diagram illustrating an example of the software configuration of a television receiver 1 (Embodiment 3).

FIG. 15 is a diagram illustrating an example of the software configuration of the television receiver 1 according to Embodiment 3. The configuration illustrated in FIG. 15 differs from the configuration illustrated in FIG. 13B in Embodiment 2 in that a call program 104e is further stored in the storage unit 104. The call program 104e is expanded in the RAM 103 and the main control unit 101 executes the call program 104e to implement a call execution unit 103e. The call execution unit 103e makes a voice call or a video call to the other party of the portable terminal device 2 in the television receiver 1. In addition, the notification execution unit 103c displays not only the incoming call information from the portable terminal device 2 but also mail from the opposite party received by the portable terminal device 2.

Figure 16:
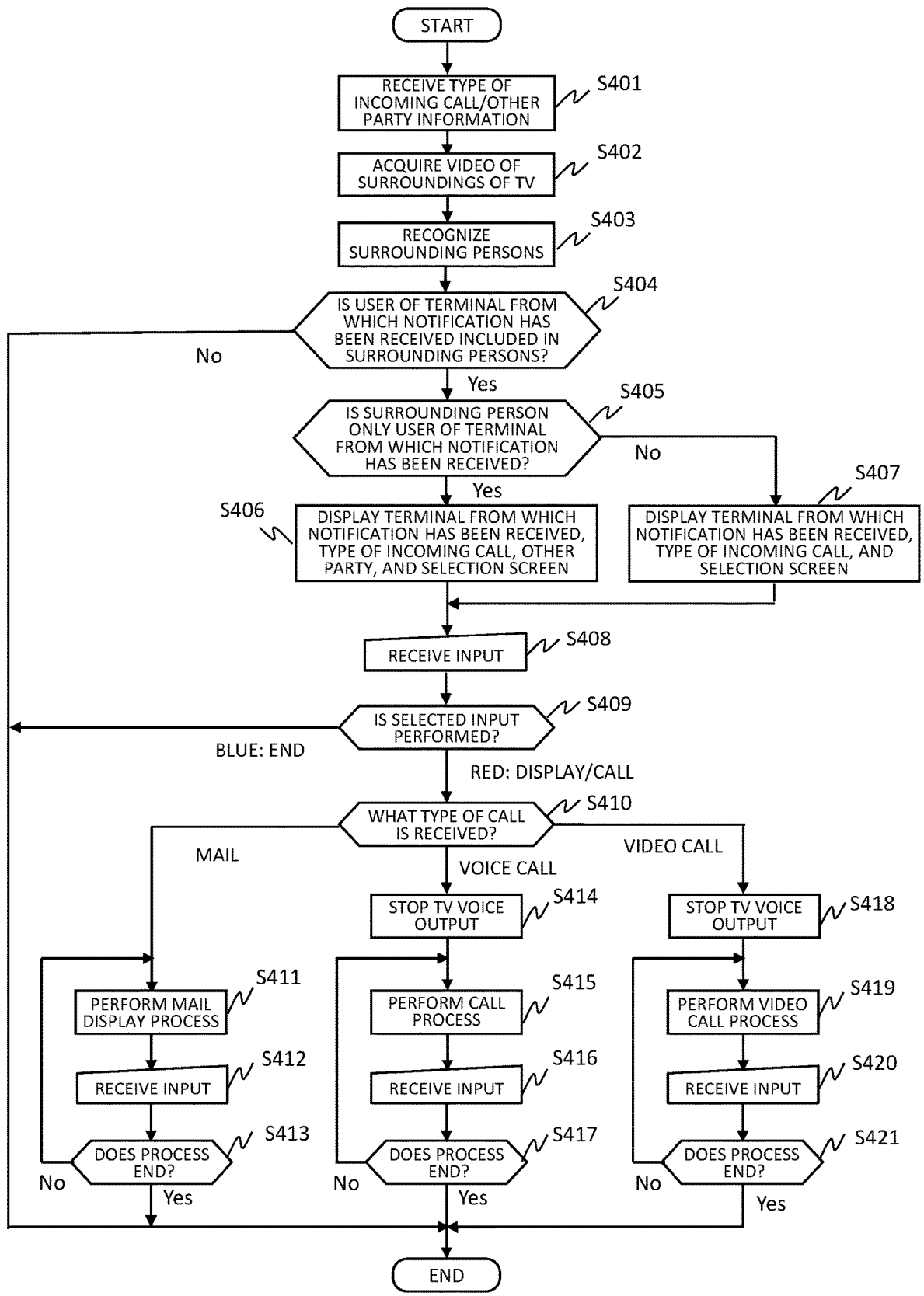
FIG. 16 is a flowchart illustrating an example of a notification/call operation of the television receiver 1.

FIG. 16 is a flowchart illustrating an example of a notification/call operation of the television receiver 1. This process is mainly performed by the notification execution unit 103c and the call execution unit 103e. A process from S401 to S407 is the same as that illustrated in FIG. 14 and an incoming call is notified and displayed while privacy is protected.

Figure 17:
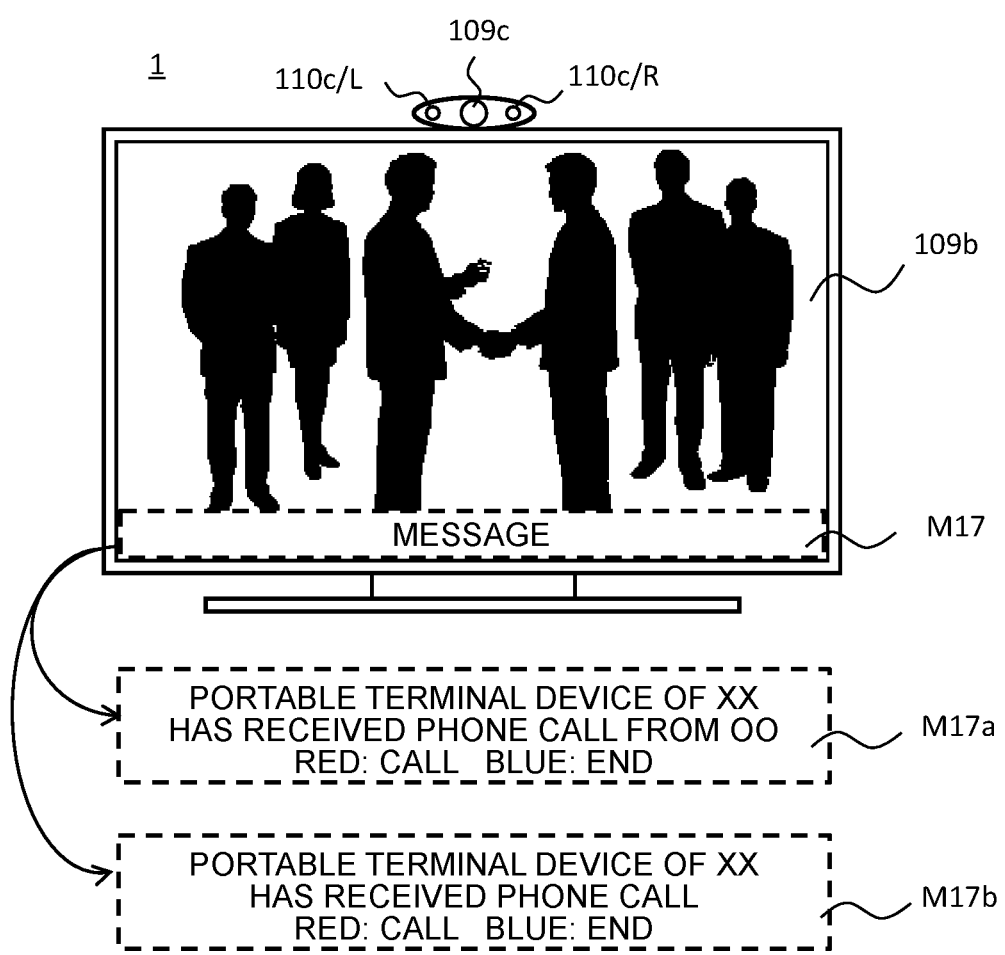
FIG. 17 is a diagram illustrating an example in which the notification of a received call by the portable terminal device 2 is displayed on the television receiver 1.

FIG. 17 is a diagram illustrating an example in which an incoming call notification from the portable terminal device 2 is displayed on the television receiver 1.

In S406, in a case where only the user of the portable terminal device 2 from which the notification has been received is present around the television receiver 1, a message M17a indicating the information of the portable terminal device 2 from which the notification has been received, the information of the other party, and the information of the type of incoming call is displayed on the video display unit 109b. In addition, a process selection screen which will be described below is added to the message M17a. Here, a process is selected by a color key of the remote controller 120. A red key is selected to display a phone call or mail and a blue key is selected to end the process.

In contrast, in S407, in a case where there is a person other than the user of the portable terminal device 2 from which the notification has been received around the television receiver 1, a message M17b indicating the information of the portable terminal device 2 from which the notification has been received and the information of the type of incoming call is displayed on the video display unit 109b illustrated in FIG. 17. In addition, a process selection screen which will be described below is added to the message M17b. The process selection screen is the same as that in the case of the message M17a. Hereinafter, the process will be described step by step.

S408: An input selected by the color key of the remote controller 120 is received.

S409: In the selected input, in a case where the red key is selected, the process proceeds to S410. In a case where the blue key is selected for input, the process ends.

S410: A branch process is performed on the basis of the information of the type of incoming call. In a case where the incoming call is mail, the process proceeds to S411. In a case where the incoming call is a phone call (video call) using a video and voice, the process proceeds to S418.

Figure 18A:
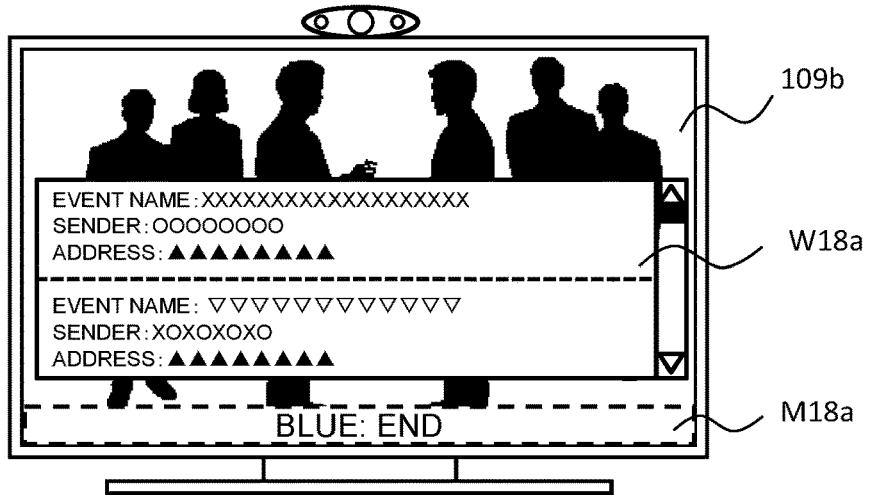
FIG. 18A is a diagram illustrating an example in which mail is displayed by the television receiver 1.
Figure 18B:
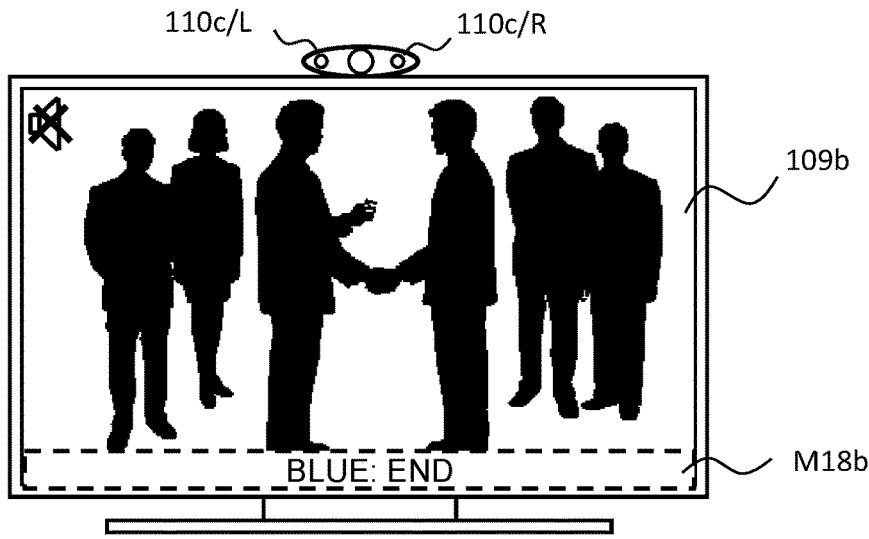
FIG. 18B is a diagram illustrating an example in which a voice call is made by the television receiver 1.
Figure 18C:
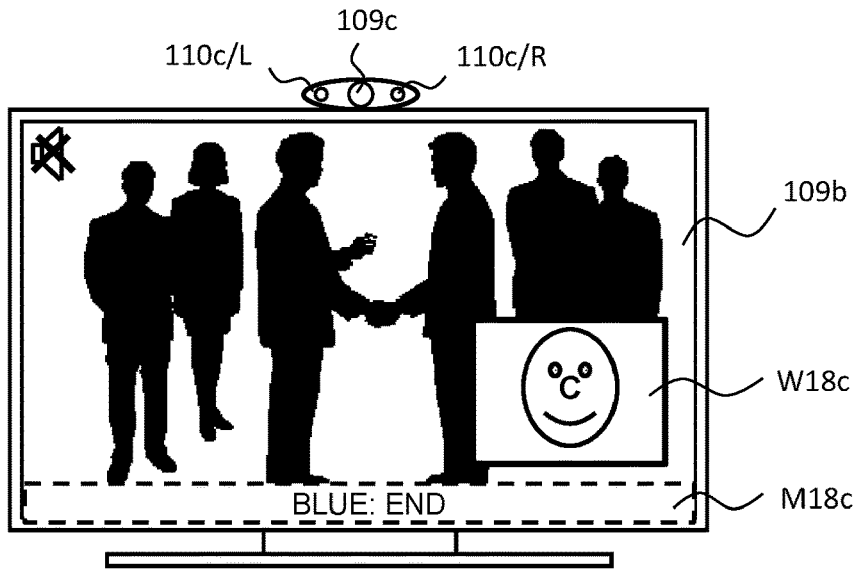
FIG. 18C is a diagram illustrating an example in which a video call is made by the television receiver 1.

FIGS. 18A, 18B, and 18C are diagrams illustrating examples in which the television receiver 1 is used to perform mail display, a voice call, and a video call, respectively.

S411: In a case where the incoming call is mail, the information (mail text) of the mail received by the portable terminal device 2 is displayed on a sub-screen W18a of the video display unit 109b as illustrated in FIG. 18A. In addition, a message M18a which is a selection screen for ending mail display is displayed.

S412: An input selected by the remote controller 120 is received.

S413: The process from S411 to S413 is repeated until the blue key (end) is selected for input by the remote controller 120.

S414: In a case where the incoming call is a voice call, the output of the voice of a broadcast program or the output of the voice reproduced from the content stored in the storage unit 104 by the voice output unit 110b is stopped as illustrated in FIG. 18B. In addition, the output of a video by the video display unit 109b continues.

S415: A voice call is made through the television receiver 1. That is, the user's voice is input by the voice input unit 110c (L/R) and the communication unit 106 transmits voice data to the paired portable terminal device 2. In contrast, the television receiver 1 receives the voice data of the other party acquired by the mobile telephone network communication unit 210*b* from the portable terminal device 2 and outputs the voice data from the voice output unit 110*b*. In this way, the user makes a voice call to the other party of the portable terminal device 2 through the television receiver 1. In addition, a message M18*b* which is a selection screen for ending the voice call is displayed on the video display unit 109*b* illustrated in FIG. 18B.

S416: An input selected by the remote controller 120 is received.

S417: The process from S415 to S417 is repeated until the blue key (end) is selected for input by the remote controller 120.

S418: In a case where the incoming call is a video call, the output of the voice of a broadcast program or the output of the voice reproduced from the content stored in the storage unit 104 is stopped as illustrated in FIG. 18C. In addition, the output of a video by the video display unit 109*b* continues.

S419: A video call is made through the television receiver 1. That is, the video of the user is input by the imaging unit 109*c*, the user's voice is input by the voice input unit 110*c* (L/R), and the communication unit 106 transmits video data and voice data to the paired portable terminal device 2. In contrast, the television receiver 1 receives the video data and voice data of the other party acquired by the mobile telephone network communication unit 210*b* from the portable terminal device 2, displays the video data on a sub-screen W18*c*, and outputs the voice data from the voice output unit 110*b*. In this way, the user makes a phone call using a video and voice to the other party of the portable terminal device 2 through the television receiver 1. In addition, a message M18*c* which is a selection screen for ending the video call is displayed on the video display unit 109*b* illustrated in FIG. 18C.

S420: An input selected by the remote controller 120 is received.

S421: The process from S419 to S421 is repeated until the blue key (end) is selected for input by the remote controller 120.

In the above-mentioned flowchart, in a case where the television receiver 1 performs mail display, a voice call, and a video call, for example, voice data and video data may be transmitted and received between the television receiver 1 and the portable terminal device 2 by the wireless LAN communication unit 210*a* or the near field communication unit 210*c*.

In Embodiment 3, it is possible not only to display the information of the call received by the portable terminal device 2 on the television receiver 1, but also to display the mail selected by the user or to make a phone call through the television receiver 1. In this case, it is possible to switch between a display process and a call process according to the type of incoming call, without moving the portable terminal device 2 from the charging device 3. Therefore, user convenience is significantly improved.

The following can be possible as modification examples of Embodiment 3.

In a case where the received mail is displayed in FIG. 18A, the display of a key corresponding to the scroll or selection of mail display may be added as the content of the message M18*a*.

In addition, in a case where a voice call or a video call is received, the portable terminal device 2 outputs, for example, a voice message "Please wait for a moment" to the other party until an input is received in S409. In addition, in a case where an input is not received for a predetermined period of time or more, the notification operation of the television receiver 1 may end and the portable terminal device 2 may be switched to the operation of an answering machine.

The user recognition process from S402 to S405 in FIG. 16 is not performed and the incoming call information received from the portable terminal device 2 is displayed as the message M17*b* (the information of the other party is not displayed) illustrated in FIG. 17. Then, in a case where the red key (mail display or a call) is selected, the user may be allowed to input a password set to each user of the portable terminal device 2 through the remote controller 120 for identification. Then, mail text may be display or a phone call may be made.

Alternatively, the user recognition process from S402 to S405 in FIG. 16 may not be performed and an incoming call may be notified and displayed according to the posture of the portable terminal device 2 while privacy is ensured, as illustrated in FIGS. 7 and 10 in Embodiment 1.

In each of the above-described embodiments, the portable terminal device 2 is separated from the user's hands in a case where the portable terminal device 2 is charged by the charging device 3. However, the invention is not limited thereto. For example, the portable terminal device 2 is similarly separated from the user's hands in a case where the portable terminal device 2 is charged from the extended interface unit 206 (USB interface) through a wired cable or in a case where the portable terminal device 2 is connected to other devices. Therefore, in this case, similarly, information related to the incoming call to be notified to the television receiver 1 is changed according to the posture of the portable terminal device 2 (Embodiment 1) or information related to the incoming call to be displayed by the television receiver 1 is changed according to the user recognized by the television receiver 1 (Embodiment 2). In this case, it is possible to check an incoming call while ensuring the privacy of the user.

Examples of the embodiments of the invention have been described above. Of course, the configuration for achieving the technology of the invention is not limited to the embodiments and various modification examples are considered. For example, the messages described in the specification and the drawings are illustrative examples and the effects of the invention are obtained even in a case where different messages are used.

Some or all of the above-mentioned functions of the invention may be implemented by hardware. For example, some or all of the above-mentioned functions may be designed by integrated circuits. In addition, some or all of the above-mentioned functions may be implemented by software. For example, a microprocessor unit may interpret and execute a program for implementing each function. Hardware and software may be used in combination.

In addition, the control lines and the information lines illustrated in the drawings indicate what is considered to be necessary for explanation and do not necessarily indicate all of the control lines and the information lines on the product. In practice, it may be considered that almost all of the configurations are connected to each other.

REFERENCE SIGNS LIST

1 Television receiver
2 Portable terminal device
3 Charging device
103*b* Device cooperation execution unit
103*c* Notification execution unit
103*d* User recognition execution unit 103e Call execution unit
106 Communication unit
109b Video display unit
109c Imaging unit
110c Voice input unit
203b Device cooperation execution unit
203c Notification execution unit
203d Charging management execution unit
203e Posture detection execution unit
208a Video display unit
210 Communication unit

The invention claimed is:

1. A smartphone configured to send information related to an incoming communication to an external display apparatus, the smartphone comprising:
   a communication interface configured to receive the incoming communication;
   a sensor configured to detect whether the smartphone is placed with a screen of the smartphone facing up or facing down in a state of being separated from a user's hand;
   a speaker for outputting sound when the incoming communication is received; and
   a processor programmed to communicate with the external display apparatus,
   wherein the processor is configured to:
      when the sensor detects that the smartphone is placed with the screen facing down and the incoming communication is received, change a content of the information related to the incoming communication; and
      send the changed information related to the incoming communication to the external display apparatus without outputting the sound by the speaker.

2. The smartphone according to claim 1, wherein the sensor includes at least an acceleration sensor, a gyro sensor, a proximity sensor, an imager or combination of them.

3. The smartphone according to claim 1, further comprising
   a battery which is rechargeable,
   wherein the processor is programmed to send the information or the changed information related to the incoming communication to the external display apparatus when the communication interface receives the incoming communication when the battery is being charged.

4. The smartphone according to claim 1,
   wherein the sensor includes an acceleration sensor that detects acceleration of the smartphone, and
   wherein the processor is programmed to determine whether the smartphone is placed with the screen facing up or facing down based on an output from the acceleration sensor.

5. The smartphone according to claim 1, further comprising
   an imager that generates video data,
   wherein the processor is programmed to determine whether the smartphone is placed with the screen facing up or facing down based on the video data generated by the imager.

6. The smartphone according to claim 1,
   wherein the communication interface includes a wireless LAN communication interface, a mobile telephone network communication interface, and a near field communication interface, and
   wherein the processor is programmed to send the information or the changed information related to the incoming communication to the external display apparatus by using the wireless LAN communication interface.

7. The smartphone according to claim 1, wherein the incoming communication includes a phone call or mail.

8. A method for sending information related to an incoming communication to an external display apparatus by a smartphone, the method comprising:
   detecting whether the smartphone is placed with a screen of the smartphone facing up or facing down in a state of separating from a user's hand by a sensor of the smartphone;
   receiving the incoming communication;
   communicating with the external display apparatus,
   wherein, when detecting that the smartphone is placed with the screen facing down and receiving the incoming communication, a content of the information related to the incoming communication is changed; and
   the changed information related to the incoming communication is sent to the external display apparatus without outputting sound by a speaker of the smartphone.

9. The method according to claim 8, wherein the sensor includes at least an acceleration sensor, a gyro sensor, a proximity sensor, an imager or combination of them.

10. The method according to claim 8, further comprising
   sending the information or the changed information related to the incoming communication to the external display apparatus when receiving the incoming communication during charging a rechargeable battery.

11. The method according to claim 8, further comprising
   determining whether the smartphone is placed with the screen facing up or facing down based on an output from an acceleration sensor included in the sensor to detect acceleration of the smartphone.

12. The method according to claim 8, further comprising
   determining whether the smartphone is placed with the screen facing up or facing down based on video data generated by an imager of the smartphone.

13. The method according to claim 8, further comprising
   sending the information or the changed information related to the incoming communication to the external display apparatus by using a wireless LAN communication interface.

* * * * *